(12) United States Patent
Ki

(10) Patent No.: US 8,116,836 B2
(45) Date of Patent: *Feb. 14, 2012

(54) TRANSPORTATION INFORMATION USING COMMUNICATION NETWORK AND METHOD THEREOF

(76) Inventor: Joon Seong Ki, Inchon-si (KR)

( * ) Notice: Subject to any disclaimer, the term of this patent is extended or adjusted under 35 U.S.C. 154(b) by 231 days.

This patent is subject to a terminal disclaimer.

(21) Appl. No.: 12/359,581

(22) Filed: Jan. 26, 2009

(65) Prior Publication Data

US 2009/0176483 A1    Jul. 9, 2009

Related U.S. Application Data

(63) Continuation of application No. 10/344,508, filed as application No. PCT/KR01/01348 on Aug. 8, 2001, now Pat. No. 7,499,714.

(30) Foreign Application Priority Data

Aug. 10, 2000  (KR) .................... 2000-46323
Jul. 27, 2001  (KR) .................... 2001-45422

(51) Int. Cl.
     *H04M 1/00*   (2006.01)
(52) U.S. Cl. ............ 455/575.9; 455/426.1; 455/404.2; 455/414.3; 455/459; 455/456.3; 455/422.1; 455/569.2; 455/99
(58) Field of Classification Search ............ 455/414.2, 455/414.4, 422.1, 459
     See application file for complete search history.

(56) References Cited

U.S. PATENT DOCUMENTS 5,945,919 A * 8/1999 Trask .................. 340/825.49
5,953,673 A    9/1999 Neubauer et al.
6,308,060 B2 * 10/2001 Wortham ................ 455/426.1
6,430,496 B1 * 8/2002 Smith et al. ................ 701/117
6,819,919 B1 * 11/2004 Tanaka .................. 455/414.1

FOREIGN PATENT DOCUMENTS

| EP | 0849964 A1 | 6/1998 |
| JP | 06-150193 A | 5/1994 |
| JP | 9-128692 A | 5/1997 |
| JP | 11-046164 A | 2/1999 |
| JP | 11-283186 A | 10/1999 |
| JP | 11-283188 A | 10/1999 |
| JP | 2000-222690 A | 8/2000 |
| JP | 2000-341397 A | 8/2000 |

(Continued)

OTHER PUBLICATIONS

European Office Action for European Patent Application No. 01955729.7, dated May 21, 2004.

*Primary Examiner* — Charles Appiah
*Assistant Examiner* — Randy Peaches
(74) *Attorney, Agent, or Firm* — Edwards Wildman Palmer LLP

(57) ABSTRACT

System for processing transportation information using a communication network, comprising a customer communication means for performing a direct call connection to a transportation vehicle; a plurality of communication means provided with the transportation vehicle for performing a direct call connection with the customer communication means; an information database means for storing subscriber information; a host server means in which is operated such that the customer communication means makes a direct call connection to the communication means of the transportation vehicles sequentially according to the predetermined order based on the subscriber information and the connection history information in the information database means; and a data relay means for performing a direct call connection to the customer communication means.

26 Claims, 15 Drawing Sheets

FOREIGN PATENT DOCUMENTS

| | | |
|---|---|---|
| JP | 2001-119484 A | 4/2001 |
| KR | 10-1998-0033511 A1 | 7/1998 |
| KR | 10-1998-0068914 A1 | 10/1998 |
| KR | 1999-46519 A | 7/1999 |
| KR | 10-2000-0050157 A | 8/2000 |
| KR | 10-2001-0097444 A | 11/2001 |
| KR | 10-2001-0103905 A | 11/2001 |
| KR | 10-2001-0106613 A | 12/2001 |
| KR | 10-2002-0005268 A | 1/2002 |
| KR | 10-0322257 B1 | 1/2002 |
| WO | 00/19344 A2 | 4/2000 |
| WO | 01/76211 A1 | 10/2001 |

* cited by examiner

FIG.8

```
- CUSTOMER POSITION INFORMATION -

CUSTOMER IS LOCATED AT TRANSFER
PARKING LOT AT YANGJAE STATION
```

FIG.11

| |
|---|
| << DONGDAEMOON - SUJI-UP OFFICE >><br>DONGDAEMOON STATION (LINE 4) -> SADANG STATION (LINE 4 -> LINE 2) -> KANGNAM STATION (LINE 2) -> NEW YORK BAKERY AT KANGNAM STATION (SEAT BUS 1550-1) -> HIGHWAY -> SUJI-UP OFFICE |
| SUBWAY (500 WON, 1 HOUR) + SEAT BUS (1300 WON, 40 MINUTES) |

TRANSPORTATION INFORMATION USING COMMUNICATION NETWORK AND METHOD THEREOF

BACKGROUND OF THE INVENTION

1. Field of the Invention

The present invention relates to a system for processing transportation information using a communication network and a method thereof, and more particularly, to a system for processing transportation information and a method thereof which can establish the connection of a customer with a transportation means rapidly and efficiently by using various communication networks, and which can deliver information about mass transportation routes rapidly and correctly through a network communication with passengers.

2. Description of the Related Art

Usually, as means for transporting a passenger located at an unspecified region to a destination, taxi services using passenger cars are generally in common use. In such taxi services, since they has no service form in which a predetermined route is regularly traveled, this causes a regular inconveniency of attracting passengers while irregularly traveling an unspecified region.

To solve this inconveniency, recently, taxi call services have been established which are operated in a closed manner in unit of a taxi company. When the position and destination of a customer are identified by a consultant through a wired or wireless call with the corresponding customer, the consultant attempts to make a wireless call to a predetermined one among taxis owned by the corresponding taxi company for establishing the connection of the customer with the taxi.

Meanwhile, in case of car rental services such as sightseeing buses or rent cars, a customer can establish a rental reservation of a desired car by making a call to a corresponding rental service company with one of the phone numbers in a telephone directory or an advertisement.

Additionally, in case of a repair company in charge of the repair and inspection of an accident-occurred car, the owner of the accident-occurred car can connect to the corresponding repair shop based on the phone number of the repair shop which is personally obtained by the customer regardless of the accident point of the car.

However, in case of a plan for a customer to use a taxi using the current taxi call service, since the customer can be connected to a taxi driver by the medium of a consultant, it becomes necessary to identify the current location of the customer by making another call to the taxi driver. Thus, there is a problem that the number of calls for contacting the customer is unnecessarily increased, and that it takes a long time from the customer's request for calling a taxi until the point of time to ride the taxi.

In addition, in case of such a taxi call service, since this service is operated in a closed manner in unit of a taxi company, a number of taxis owned by the corresponding taxi company is limited, while the positions of customers requesting for the taxi call service are distributed extensively. Thus, there occurs a problem that the regions in which the taxi call service is available are restricted.

Moreover, in case of the current car rental service, the customer can contact to a rental service company through a phone number obtained from an advertisement or telephone directory regardless of the position of the customer, it is disadvantageous in that it takes a long time from the request for a car rental until the practical use of the car.

Furthermore, so that the customer can contact to a repair shop for repairing and inspecting an accident-occurred car, the repair shop of the phone number obtained personally by the corresponding customer is usually used regardless of the accident point of the corresponding car. Thus, there is a problem that it takes a long time until the repair service of the car by the repair shop, and that a traffic jam is caused by a long time negligence of the accident-occurred car.

SUMMARY OF THE INVENTION

It is, therefore, an object of the present invention to provide a system for processing transportation information using a communication network in which a customer who wants to use a transportation service is directly connected to a transportation means through various communication network, in a state that a plurality of a transportation means is managed widely as a state capable of communicating always, thereby capable of implementing a transportation service rapidly and exactly.

It is another object of the present invention to provide a method for processing transportation information using a communication network in which a customer who wants to use a transportation service is directly connected to a transportation means through various communication network, in a state that a plurality of a transportation means is managed widely as a state capable of communicating always, thereby capable of implementing a transportation service rapidly and exactly.

It is also another object of the present invention to provide a system for processing transportation information using a communication network in which the position of a customer who wants to use a transportation service and a transportation means which travels in areas adjacent to the position of the customer can be detected automatically, thereby performing a service connection rapidly by the transportation means to the customer.

It is also another object of the present invention to provide a method for processing transportation information using a communication network in which the position of a customer who wants to use a transportation service and a transportation means which travels in areas adjacent to the position of the customer can be detected automatically, thereby performing a service connection rapidly by the transportation means to the customer.

It is also another object of the present invention to provide a system for processing transportation information using a communication network which automatically identifies the position of a customer who wants to use a transportation service and provides information on customer's position to a transportation means, thereby capable of identifying the position of the customer rapidly.

It is also another object of the present invention to provide a method for processing transportation information using a communication network which automatically identifies the position of a customer who wants to use a transportation service and provides information on customer's position to a transportation means, thereby capable of identifying the position of the customer rapidly.

It is also another object of the present invention to provide a method for processing transportation information using a communication network which can provide the shortest time mass transportation route information on a route to the destination of a customer who wants to move by the request of information about the mass transportation route.

To achieve the above object, there is provided a system for processing transportation information using a communication network comprising a customer communication means for performing a direct call connection to a transportation vehicle by the operation of a customer who wants to use a transportation service through the transportation vehicle; a plurality of communication means for transportation vehicles provided with the transportation vehicle for providing a transportation service for performing a direct call connection with the customer communication means; an information database means for storing subscriber information on the plurality of transportation vehicles and communication means of transportation vehicles, connection history information of the communication means of each transportation vehicle and information on a charge as a cost for service of the customer communication means; a host server means in which when connecting the customer communication means for using the transportation service, it is operated such that the customer communication means makes a direct call connection to the communication means of the transportation vehicles sequentially according to the predetermined order based on the subscriber information and the connection history information in the information database means; and a data relay means for performing a direct call connection to the customer communication means by calling a predetermined communication means of a transportation vehicle according to the call command by the host server means.

BRIEF DESCRIPTION OF THE DRAWINGS

The above objects, features and advantages of the present invention will become more apparent from the following detailed description when taken in conjunction with the accompanying drawings, in which:

FIG. 8 is a view illustrating one example of searching for the location of a customer through a messaging service according to the fourth embodiment of the present invention;

FIG. 11 is a view illustrating one example of searching for mass transportation information on a route to the destination of a customer according to the sixth embodiment of the present invention;

DETAILED DESCRIPTION OF THE PREFERRED EMBODIMENT

A first embodiment of the present invention will now be described with reference to the accompanying drawings.

Figure 1:
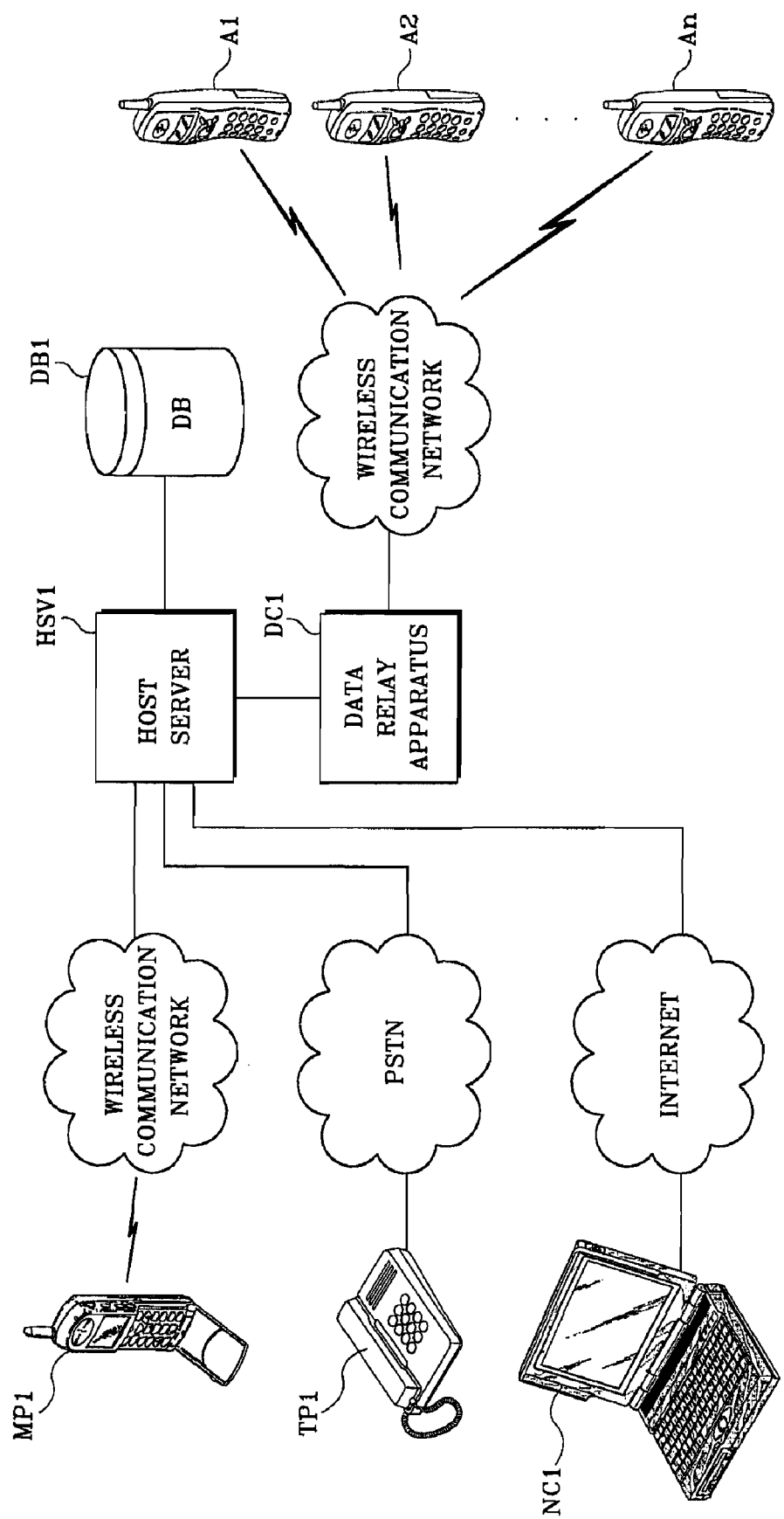
FIG. 1 is a view illustrating the overall construction of a system for processing transportation information using a communication network according to a first embodiment of the present invention.

That is, FIG. 1 is a view illustrating the overall construction of a system for processing transportation information using a communication network according to a first embodiment of the present invention.

As illustrated in FIG. 1, in the first embodiment of the present invention, to receive transportation services by various transportation means, such as a taxi call service, a repair shop's car transfer service for an accident-occurred car, a car rental service, a door-to-door delivery service by a delivery vehicle, when a customer attempts to make a call to the phone number assigned for the corresponding transportation service through wired/wireless telephone means or internet telephone means, a host server establishes a direct call connection to a communication means of the customer sequentially with respect to mobile communication terminals provided at a plurality of transportation means subscribed for the transportation service.

In the same drawing, a customer mobile communication terminal MP1 is configured to make a call connection to a host server HSV1 wirelessly via a wireless communication network by dialing the phone number assigned to a transportation service by a transportation means. By establishing a direct call connection to a mobile communication terminal of a predetermined transportation means by the host server HSV1, it is possible to execute information exchange for a transportation contract with a driver of the corresponding transportation means.

A wired communication terminal TP1 is configured to make a call connection to the host server HSV1 by wire via a public switched telephone network (PSTN) by dialing the phone number assigned to the transportation service by the transportation means. By establishing a direct call connection to a mobile communication terminal of a predetermined transportation means by the host server HSV1, it is possible to execute information exchange for a transportation contract with a driver of the corresponding transportation means.

In addition, a network computer NC1 is provided with a wire or wireless modem for network communication and a dedicated web browser program. When the network computer NC1 performs a request for the transportation service by the transportation means by connecting to a web site for an internet phone service via the internet communication network or connecting to the internet phone service provided at the host server HSV1, a direct call connection to the mobile communication terminal of the predetermined transportation means is made by the host server HSV1, for thereby achieving information exchange for a transportation contract with a driver of the corresponding transportation means.

Here, to establish a direct call connection to the mobile communication terminal of the transportation means by using the network computer NC1, it is necessary that a gateway equipment for data exchange of the internet and a general telephone network is required in the internet communication network and in the wireless communication network formed at the mobile communication terminal of the transportation means.

In the same drawing, mobile communication terminals A1 through An provided at a plurality of transportation means can exchange information for transportation contract by voice by making a direct call connection to the communication means of a predetermined customer relayed from the host server HSV1 via a wireless communication network.

In addition, an information database DB1 stores subscriber information on the plurality of transportation means and vehicle numbers and phone numbers for the mobile communication terminals A1 through An provided at each of the plurality of transportation means, stores connection history information of the mobile communication terminals provided at the plurality of transportation means for making a direct call connection to a customer sequentially, and stores information on a charge as a cost for receiving the transportation service by the transportation means via the communication network.

In the same drawing, when the host server HSV1 makes a wire call connection to the customer mobile communication terminal MP1 via the wireless communication network, makes a wire call connection to the wired communication terminal TP1 via the public switched telephone network (PSTN), or makes a call connection to the network computer NC1 by an internet phone via the internet communication network, it is operated such that the communication means of the customer makes a direct call connection sequentially to the plurality of mobile communication terminals A1 through An based on the subscriber information on the transportation means and the connection history information in the information database DB1.

In addition, a data relay apparatus DC1 performs relay processing for a direct call connection to the communication means of the customer by calling a predetermined one of the mobile communication terminals A1 through An provided at the plurality of transportation means via the wireless communication network according to the command of the direct call connection by the host server HSV1.

Here, in case of calling a mobile communication terminal designated by the host server HSV1, if it is expected that a direct call connection to the customer is not achieved because the corresponding mobile communication terminal is busy or the power is turned off, the data relay apparatus DC1 transmits call failure information to the host server HSV1. Then, the host server HSV1 performs the calling of the mobile communication terminal of the next order of the mobile communication terminal whose calling has been failed when the call failure information is received.

Meanwhile, the host server HSV1 can impose a charge for the transportation means of the customer who has made a call to the phone number assigned to the corresponding service in order to request for the transportation service by the transportation means by making a business co-operation contract with a communication service company such as Korea Telecom.

Meanwhile, the plurality of mobile communication terminals A1 through An can transmit empty vehicle information representing whether there exists an empty vehicle of each transportation means or not to the host server HSV1 via the wireless communication network and the data relay apparatus DC1 by the operation of a special functional button. The host server HSV1 enables a direct call connection to the customer by giving an effective function of the transportation service only to the mobile communication terminal that has transmitted the empty vehicle information among the plurality of mobile communication terminals A1 through An.

Figure 2:
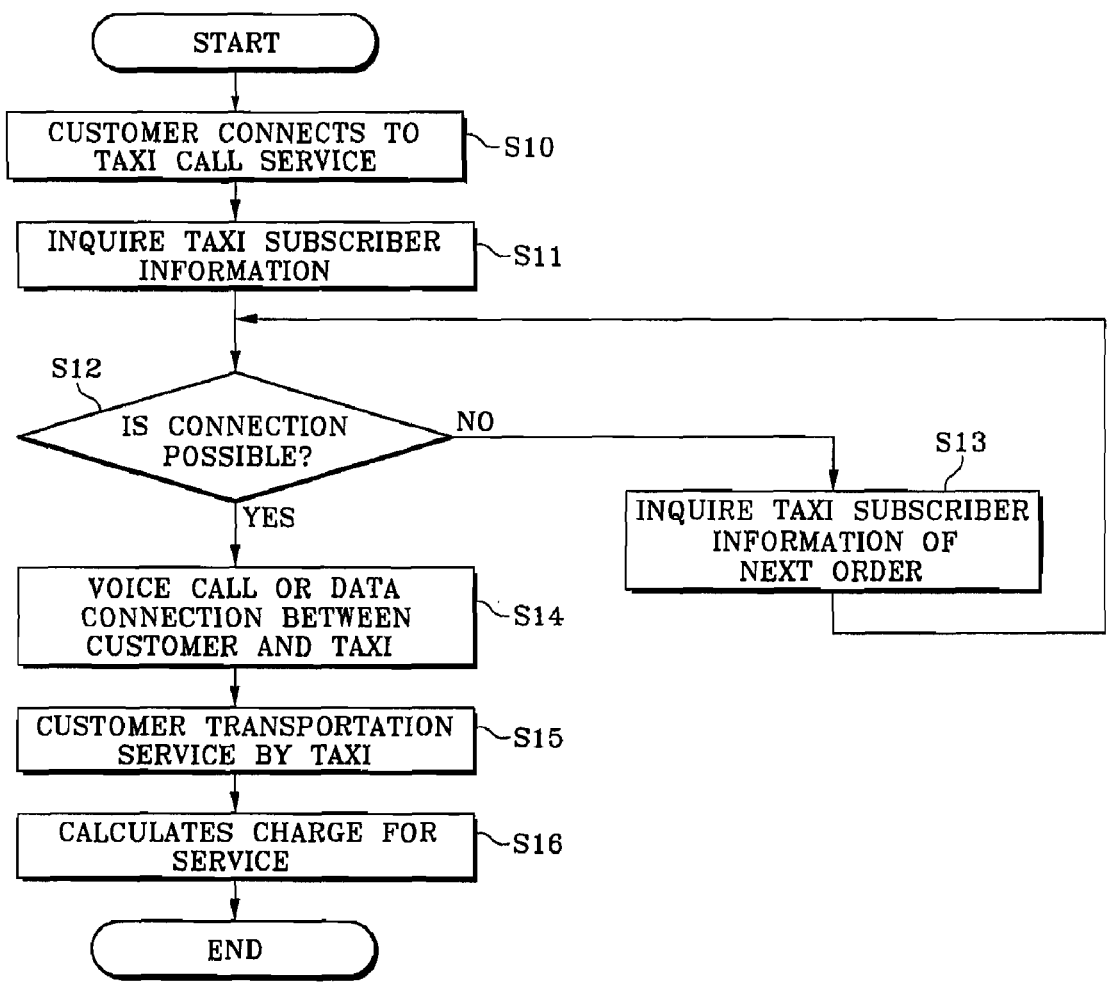
FIG. 2 is a flow chart illustrating a method for processing transportation information using a communication network according to the first embodiment of the present invention.

Continuously, the operation according to the first embodiment of the present invention will be described in detail with reference to the flow chart of FIG. 2.

As illustrated in the flow chart of FIG. 2, the first embodiment of the present invention will be described by taking an example of a taxi call service serving as a transportation service by a transportation means.

Firstly, a customer who wants to ride a taxi connects to the host server HSV1 via a wireless communication network by dialing the phone number assigned to the taxi call service by operating the customer mobile communication terminal MP1, connects to the host server HSV1 via the public switched telephone network (PSTN) by operating the wired communication terminal TP1, or connects to the host server HSV1 according to an internet phone function via the internet communication network by operating the network computer NC1 (in step S10). Then, the host server HSV1 performs the calling of the mobile communication terminal provided at the taxi of a predetermined order by referring to subscriber information on a plurality of taxis and connection history information of the mobile communication terminals A1 through An provided at the plurality of taxis (in step S11).

Here, the host server HSV1 judges whether or not a direct call connection is made by the data relay apparatus DC1 between the transportation means of the customer and the mobile communication terminal of the corresponding order (in step S12).

As the result of judging, if it is judged that a direct call connection to the transportation means of the customer is not made as the calling of the terminal is not achieved because the mobile communication terminal of the corresponding order is busy or the power is turned off, the host server HSV1 calls the mobile communication terminal provided at the taxi of the next order by referring to the information stored in the information database DB1 (in step S13). Then, the routine returns to the step S12 for repeating the step of judging whether or not a direct call connection to the transportation means of the customer is made.

Nevertheless, it is preferred that the host server HSV1 can make a direct call connection to the transportation means of the customer effectively only with respect to the mobile communication terminal that has already transmitted the empty vehicle information among the plurality of mobile communication terminals A1 through An.

Meanwhile, according to the result of judging, if it is judged that a direct call connection is made between the transportation means of the customer and the mobile communication terminal provided at the taxi of the corresponding order, the host server HSV1 enables the exchange of voice calls or character data by making a direct call connection between the customer mobile communication terminal MP1, the wired communication terminal TP1 or the network computer NC1 and the mobile communication terminal of the taxi (in step S14).

In this state, the taxi with the corresponding mobile communication terminal performs a service of transportation to the destination of the customer, in the condition that a contract with the customer has been made via the communication network (in step S15). The host server HSV1 performs the calculation of the charge for the taxi call service with respect to the customer mobile communication terminal MP1, the wireless communication terminal TP1, or the network computer NC1 (in step S16).

Next, a second embodiment of the present invention will be described in detail with reference to the accompanying drawings.

Figure 3:
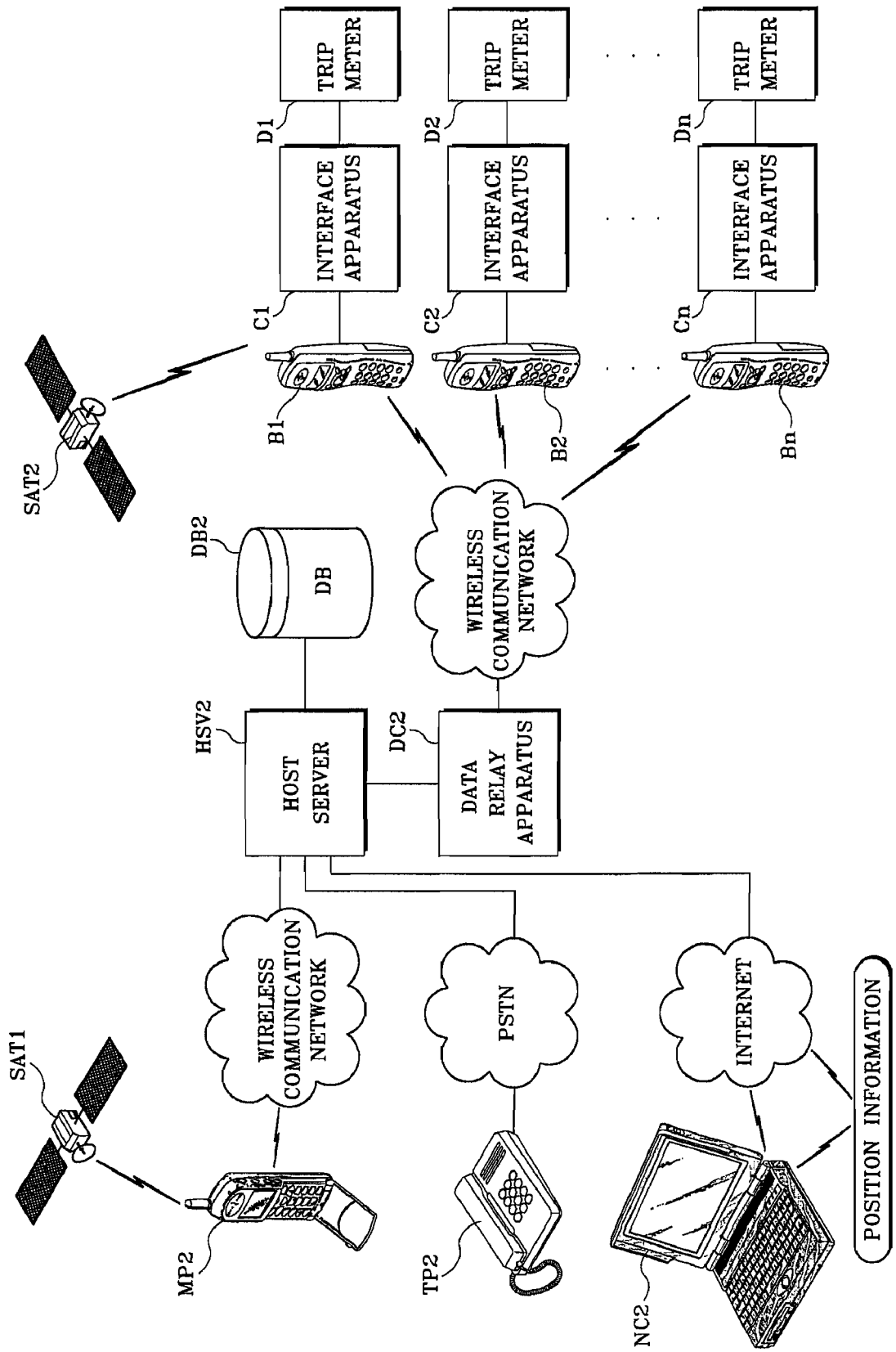
FIG. 3 is a view illustrating the overall construction of a system for processing transportation information using a communication network according to a second embodiment of the present invention.

In other words, FIG. 3 is a view illustrating the overall construction of a system for processing transportation information using a communication network according to a second embodiment of the present invention.

As illustrated in FIG. 3, according to the second embodiment of the present invention, in a state that trip position information of the transportation means detected through a GPS satellite is received from the host server, when a certain customer attempts a call connection for requesting a transportation service by the transportation means, the transportation means being on a trip in areas adjacent to the current position of the customer is detected based on the position information of the customer transmitted from the communication means of the customer. Thus, the transportation means being on a trip in adjacent areas and the customer establish a direct call connection via the communication network for thereby achieving information exchange for a transportation contract.

In the same drawing, the customer mobile communication terminal MP2 is provided with a function for receiving position information transmitted from the GPS satellite SAT1 and transmitting the position information of the corresponding terminal to the other party via a wireless communication network, and is configured to connect to the host server HSV2 via the wireless communication network by dialing the phone number assigned to the transportation service by the transportation means and to wirelessly transmit the customer position information of the terminal received from the GPS satellite SAT1. When the transportation means being on a trip in areas adjacent to the current position of the customer with the corresponding mobile communication terminal MP2 is detected based on the customer position information according to the GPS satellite SAT1 by the host server HSV2, a direct call connection to the mobile communication terminal of the transportation means is established for thereby achieving information exchange for a transportation contract.

In addition, the wired communication terminal TP2 is configured to connect to the host server HSV2 via the public switched telephone network by dialing the phone number assigned to the transportation service by the transportation means. When the current position information of the customer is transmitted through an automatic voice response service (ARS) by the host server HSV2, a direct call connection to the transportation means being on a trip in areas adjacent to the current position of the corresponding customer is automatically established for thereby achieving information exchange for a transportation contract.

Here, it is possible to identify the position for the wired communication terminal TP2 through user information of the phone number owned by a billing computer in a telephone exchange included in the public switched telephone network, that is, the phone number assigned to the corresponding wired communication terminal TP2. When the user information is transmitted from the billing computer of the telephone exchange to the host server HSV2, the host server HSV2 can identify the current position of the wired communication terminal TP2 by referring to the addresses contained in the user information.

In the same drawing, the network computer NC2 is configured to connect to the host server HSV2 via the internet communication network by dialing the phone number assigned to the transportation service by the transportation means through the internet telephone function. When the position information of the customer is transmitted in the form of web mail by connecting to the web site constructed at the host server HSV2, a voice call is made through the transportation means being on a trip in areas adjacent to the current position of the corresponding customer and the internet telephone function for thereby achieving information exchange for a transportation contract.

Meanwhile, the information database DB2 stores subscriber information on the plurality of transportation means and vehicle numbers and phone numbers for the mobile communication terminals B1 through Bn provided at each of the plurality of transportation means, updates and stores the trip position information received from the mobile communication terminals B1 through Bn of each transportation means every predetermined periods of time, and stores information on a charge as a cost for receiving the transportation service by the transportation means via the communication network.

When the host server HSV2 detects the current position of the customer through customer position information received from the customer mobile communication terminal MP2 by the GPS satellite SAT1 via the wireless communication terminal, the transportation means being on a trip in areas most adjacent to the current position of the customer is searched for based on the subscriber information of the information database DB2 and the trip position information on the plurality of transportation means, for thereby establishing a direct call connection between the mobile communication terminal of the transportation means being on a trip in the adjacent area and the customer mobile communication terminal.

In addition, when the automatic voice response system for detecting the position information of the customer is constructed and a call connection to the wireless communication terminal TP2 is made via the public switched telephone network PSTN, the host server HSV2 receives the position information of the customer by starting the service of the automatic voice response system ARS and a direct call connection between the corresponding transportation means and the customer is established by detecting the transportation means being on a trip in areas adjacent to the current position of the customer based on the position information of the customer.

Here, the host server HSV2 has the function of identifying the position of the corresponding wireless communication terminal TP2 by checking the address of the user by receiving user information on the phone number of the wireless communication terminal TP2 from the billing computer of the telephone exchange network contained in the public switched telephone network, as well as the function of inputting position information using the automatic voice response system.

In addition, with respect to the host server HSV2, the position information of the customer is received via the internet communication network and, at the same time, the web site having an internet phone function is constructed. Then, when the network computer NC2 transmits the position information of the customer in the form of web mail by connecting to the web site via the internet communication network, the transportation means being on a trip in areas adjacent to the current position of the customer is detected based on the position information, for thereby establishing a direct call connection between the transportation means being on a trip in the adjacent areas and the customer.

In the same drawing, the data relay apparatus DC2 performs relay processing for a direct call connection with the communication means of the customer by calling the mobile communication terminal of the transportation means being on a trip in areas adjacent to the current position of the customer among those mobile communication terminals B1 through Bn provided at the plurality of transportation means via the wireless communication network according to the command of the direct call connection by the host server HSV2.

Here, in case of calling a mobile communication terminal designated by the host server HSV2, if it is expected that a direct call connection to the lo customer is not achieved because the corresponding mobile communication terminal is busy or the power is turned off, the data relay apparatus DC2 transmits call failure information to the host server HSV1. At this time, the host server HSV2 performs the calling of the mobile communication terminal of another transportation means being on a trip in areas adjacent to the current position of the customer, in place of the transportation means having the mobile communication terminal whose calling has been failed.

In the same drawing, the mobile communication terminals B1 through Bn provided at the plurality of transportation means have the function of wirelessly transmitting the position information received from the GPS satellite SAT2 via the wireless communication network, transmit the position information of the GPS satellite SAT2 serving as the trip position information of the corresponding transportation means via the wireless communication network at any time even in the state that the call is off, and enables the exchange of voice calls and data by a direct call connection to the communication means of the customer via the wireless communication network.

Moreover, the plurality of mobile communication terminals B1 through Bn are signally connected to a plurality of trip meters D1 through Dn provided at each of the transportation means by the medium of a plurality of interface apparatuses C1 through Cn. The plurality of trip meters D1 through Dn serve as taxi meters in a case that the corresponding transportation means is, for example, a taxi, and generates the value of a trip fare estimated by accumulating the distance and time of the trip in the state that the customer has got a ride into the taxi as an electrical trip signal. The plurality of interface apparatuses C1 through Cn performs the processing of converting the trip signal generated from each of the trip meters D1 through Dn into data of the transmittable format.

Here, as a certain customer rides into the taxi and the trip meters D1 through Dn are operated, the plurality of mobile communication terminals B1 through Bn receive the trip data through each of the interface apparatuses C1 through Cn according to the trip fare generated from each trip meter D1 through Dn at the point of time that the transportation of the customer is finished, and provides them to the host server HSV2 through the wireless communication terminal and the data relay apparatus DC2.

The host server HSV2 estimates the trip fare by analyzing the trip data of each transportation means transmitted from the plurality of mobile communication terminals B1 through Bn, and differently imposes fares of the transportation service by the transportation means of the customer according to the amount of the trip fare.

Meanwhile, the plurality of mobile communication terminals B1 through Bn can transmit empty vehicle information representing whether there exists an empty vehicle of each transportation means or not to the host server HSV2 via the wireless communication network and the data relay apparatus DC2 by the operation of a special functional button. The host server HSV2 enables a direct call connection to the customer by giving an effective function of the transportation service only to the mobile communication terminal that has transmitted the empty vehicle information among the plurality of mobile communication terminals B1 through Bn.

Each of the mobile communication terminals B1 through Bn transmits the empty vehicle information along with a specific code information representing the trip area of the transportation vehicle when transmitting the empty vehicle information to the host server HSV2. For example, in the case that the transportation vehicle is a taxi and the trip area is limited to the Incheon area, a specific code information representing the Incheon area is stored in the mobile communication terminal provided at the transportation vehicle.

Furthermore, after a direct call connection is established between the customer mobile communication terminal MP2 and the mobile communication terminal installed at a predetermined transportation means for the purpose of information exchange for the execution of the transportation service, if it is detected that the position information transmitted from the customer mobile communication terminal MP2 and the mobile communication terminal of the transportation means by the GPS satellites SAT1 and SAT2 are identical or similar to each other for a predetermined time, the host server HSV2 judges that the customer uses the transportation service with respect to the corresponding transportation means and then determines the trip fare received from the trip meter of the transportation means to be a charge for the transportation service.

Next, the operation according to the second embodiment of the present invention will now be described in detail with reference to the flow chart of FIG. 4.

As illustrated in the flow chart of FIG. 4, the second embodiment of the present invention will be described by taking an example of a taxi call service serving as a transportation service by a transportation means.

Firstly, the host server HSV2 receives trip position information by the GPS satellite SAT2 transmitted from the mobile communication terminals B1 through Bn provided at each of a plurality of taxis through the data relay apparatus DC2 and the wireless communication network, and updates and stores them in the information database DB2 every predetermined periods of time, for example, five minutes (in step S20).

In addition, the host server HSV2 is provided with an effective function of the taxi call service with respect to the mobile communication terminal that transmits empty vehicle information among the plurality of mobile communication terminals B1 through Bn, for thereby enabling a direct call connection to the communication means of the customer only with respect to the corresponding mobile communication terminal.

In this state, a customer who wants to ride a taxi connects to the host server HSV2 via a wireless communication network by dialing the phone number assigned to the taxi call service by operating the customer mobile communication terminal MP2, connects to the host server HSV2 via the public switched telephone network (PSTN) by operating the wired communication terminal TP2, or connects to the web site constructed at the host server HSV2 via the internet communication network by operating the network computer NC2 (in step S21).

At this time, the host server HSV2 receives customer position information by the GPS satellite SAT1 transmitted from the customer mobile communication terminal MP2, receives the position information of the corresponding customer by the operation of the mobile communication terminal TP2 by operating a self-constructed automatic voice response system ARS, or receives the customer position information in the form of web mail on the web site by the network computer NC2 (in step S22).

Meanwhile, the host server HSV2 detects the current position of the corresponding customer through the position information transmitted from the communication means of the customer and then detects a taxi on a trip in areas adjacent to the current position of the customer based on the subscriber information and trip position information of the taxi in the information database DB2, for thereby calling the mobile communication terminal of the corresponding taxi through the data relay apparatus DC2 (in step S23).

Here, the host server HSV2 judges whether or not it is possible to establish a direct call connection between the mobile communication terminal of the taxi on a trip in areas adjacent to the current position of the customer and the communication means of the customer (in step S24).

As the result of judging, if it is judged that a direct call connection to the transportation means of the customer is impossible because the mobile communication terminal of the taxi is busy or the power is turned off, the host server HSV2 attempts a direct call connection to the mobile communication terminal of another taxi on a trip in areas adjacent to the current position of the customer by inquiring the information stored in the information database DB2 (in step S25).

After the execution of the step S25, the routine returns to the step S24 and executes the step of re-judging whether a direct call connection is possible between the mobile communication terminal of the taxi that has attempted the call connection and the communication means of the customer.

Meanwhile, according to the result of judging in the step S24, if it is judged that a direct call connection is possible between the mobile communication terminal of the taxi and the communication means of the customer, the host server HSV2 enables the exchange of voice calls or character data by making a direct call connection between the customer mobile communication terminal MP2, the wired communication terminal TP2 or the network computer NC2 and the mobile communication terminal of the corresponding taxi (in step S26).

Next, the taxi at which the exchange of information on a taxi ride is achieved by a direct call connection with the customer picks up the customer and executes a trip to a desired destination. The trip meter installed at the corresponding taxi accumulates the distance and time of the trip and estimates the taxi fare (in step S27).

At this time, a trip signal from the trip meter is converted into data through the interface apparatus and is transmitted to the mobile communication terminal of the corresponding taxi. Then, as the trip data produced by the trip meter is transmitted to the host server HSV2 by the mobile communication terminal through the wireless communication network and the data relay, the host server HSV2 obtains the trip data from the mobile communication terminal (in step S28).

Therefore, the host server HSV2 estimates the charge of the taxi according to the trip data received from the trip meter through the mobile communication terminal of the taxi, and differentially calculates the charge of the taxi call service by the taxi according to the amount of the trip fare (in step S29).

Nevertheless, with respect to the host server HSV2, if it is judged that the position information by the GPS satellite SAT1 transmitted from the mobile communication terminal MP2 among the communication means of the customer is identical or similar to the position information from the GPS satellite SAT2 transmitted from the mobile communication terminal of the taxi that has made a direct call connection to the mobile communication terminal MP2, it is considered that the customer has got a ride into the taxi and uses the taxi call service, for thereby processing the trip data transmitted from the trip meter of the corresponding taxi through the mobile communication terminal as an effective charge for the taxi call service.

Next, a third embodiment of the present invention will now be described in detail with reference to the accompanying drawings.

Figure 5:
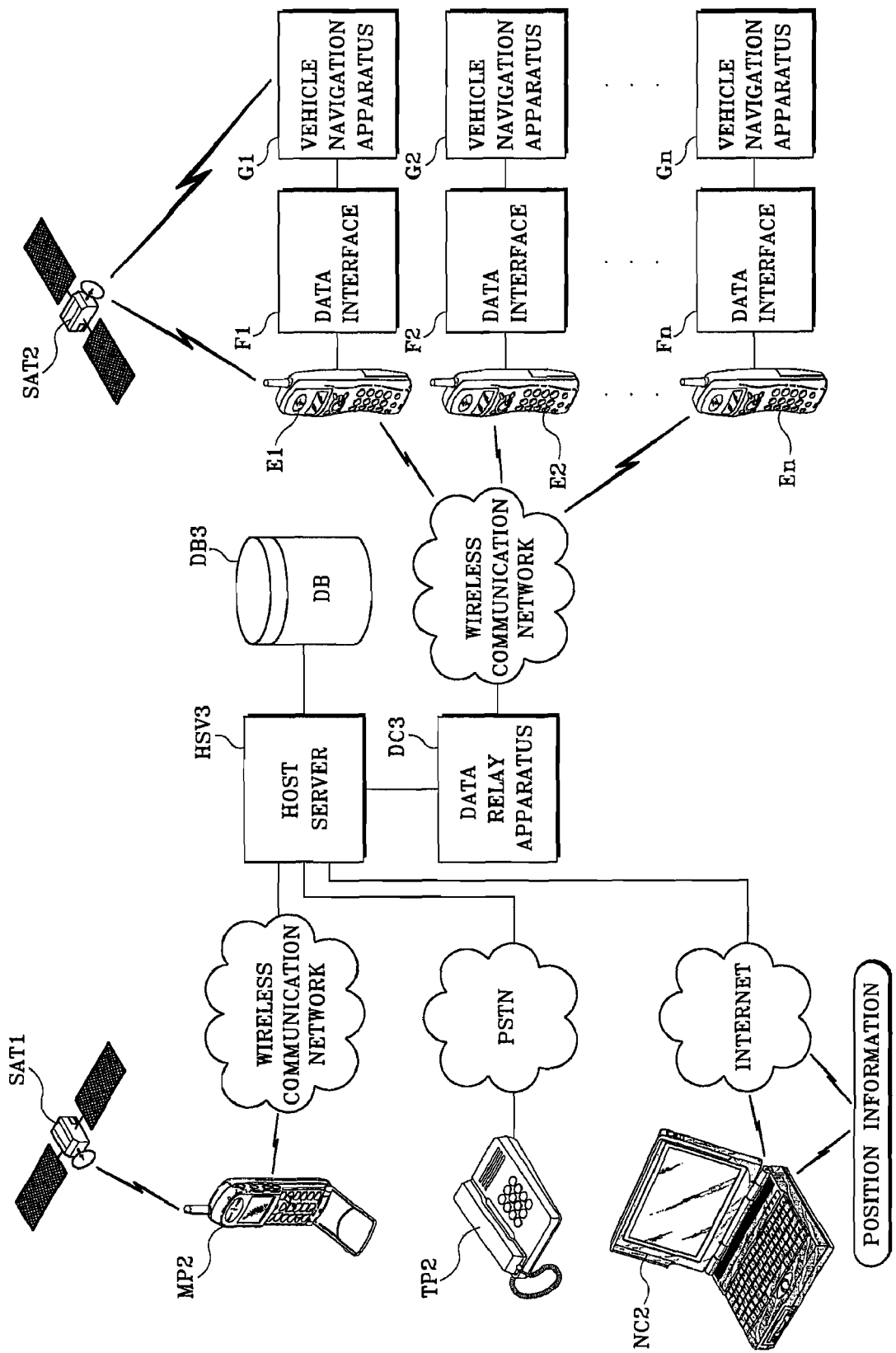
FIG. 5 is a view illustrating the overall construction of a system for processing transportation information using a communication network according to a third embodiment of the present invention.

That is, FIG. 5 is a view illustrating the overall construction of a system for processing transportation information using a communication network according to a third embodiment of the present invention. The same reference numerals are used for the elements actually similar to those of the second embodiment of the present invention as shown in FIG. 3, and a detailed description thereof will be omitted.

As illustrated in FIG. 5, according to the third embodiment, in a state that the host server has received the trip position information of the transportation means detected through the GPS satellite, when the customer attempts a call connection for requesting the transportation service by the transportation means through various communication means, a direct call connection is established between the transportation means being on a trip in adjacent areas and the customer by detecting the transportation means being on a trip in areas adjacent to the current position of the customer based on the position information transmitted from the communication means of the customer, for thereby achieving information exchange for a transportation contract. Then, the information is provided such that the current position of the corresponding customer is visually displayed through a navigation apparatus installed in the transportation means based on the position information of the customer.

In the same drawing, when the host server HSV3 detects the current position of the customer by connecting to the customer mobile communication terminal MP2 via the wireless communication terminal and receiving the position information of the customer by the GPS satellite SAT1, the transportation means being on a trip in areas most adjacent to the current position of the customer is searched for based on the subscriber information of the information database DB2 and the trip position information on the plurality of transportation means, for thereby establishing a direct call connection between the mobile communication terminal of the transportation means being on a trip in the adjacent area and the customer mobile communication terminal.

In addition, when the automatic voice response system for detecting the position information of the customer is constructed and a call connection to the wireless communication terminal TP2 is made via the public switched telephone network PSTN, the host server HSV3 receives the position information of the customer by starting the service of the automatic voice response system ARS and a direct call connection between the corresponding transportation means and the customer is established by detecting the transportation means being on a trip in areas adjacent to the current position of the customer based on the position information of the customer.

Here, the host server HSV3 has the function of identifying the position of the corresponding wireless communication terminal TP2 by checking the address of the user by receiving user information on the phone number of the wireless communication terminal TP2 from the billing computer of the telephone exchange network contained in the public switched telephone network, as well as the function of inputting position information using the automatic voice response system.

In addition, with respect to the host server HSV3, the position information of the customer is received via the internet communication network and, at the same time, the web site having an internet phone function is constructed. Then, when the network computer NC2 transmits the position information of the customer in the form of web mail by connecting to the web site via the internet communication network, the transportation means being on a trip in areas adjacent to the current position of the customer is detected based on the position information, for thereby establishing a direct call connection between the transportation means being on a trip in the adjacent areas and the customer.

Meanwhile, the host server HSV3 creates a map position data based on the position information of the customer detected by the communication means of the customer, and provides the map position data to the transportation means being service in areas most adjacent to the current position of the customer.

In the same drawing, the information database DB3 stores subscriber information on the plurality of transportation means and vehicle numbers and phone numbers for the mobile communication terminals E1 through En provided at each of the plurality of transportation means, updates and stores the trip position information received from the mobile communication terminals E1 through En of each transportation means every predetermined periods of time, stores map information data for creating the map position data on the position information of the customer and stores information on a charge as a cost for receiving the transportation service by the transportation means via the communication network.

In the same drawing, the mobile communication terminals E1 through En provided at the plurality of transportation means have the function of wirelessly transmitting the position information received from the GPS satellite SAT2 via the wireless communication network, transmit the position information of the GPS satellite SAT2 serving as the trip position information of the corresponding transportation means via the wireless communication network at any time even in the state that the call is off, and enables the exchange of voice calls and data by a direct call connection to the communication means of the customer via the wireless communication network.

Moreover, the plurality of mobile communication terminals E1 through En are signally connected to a plurality of vehicle navigation apparatuses G1 through Gn by the medium of a plurality of data interfaces F1 through Fn, and then they receive the map position data of the customer provided from the host server HSV3 via the wireless communication terminal and converts them through the data interfaces F1 through Fn for thereby visually displaying the current position of the corresponding customer on an electronic map reproduced on a display screen of the vehicle navigation apparatuses G1 through Gn.

Figure 6:
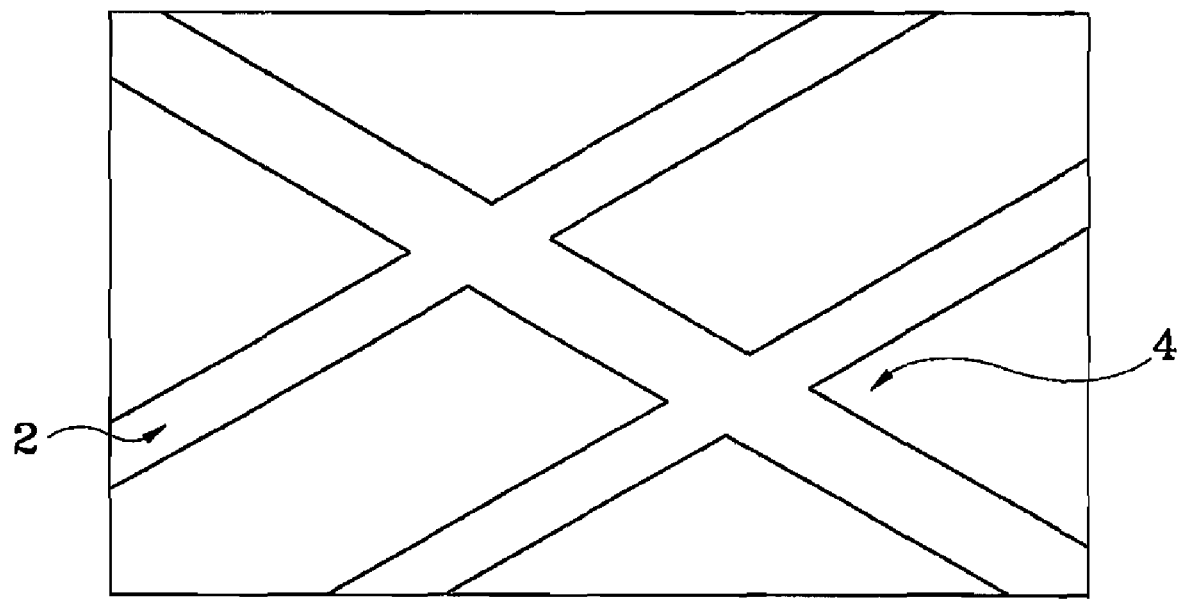
FIG. 6 is a view illustrating one example of searching for the location of a customer through a vehicle navigation apparatus according to the third embodiment of the present invention.

That is, as illustrated in FIG. 6, with respect to the plurality of vehicle navigation apparatuses G1 through Gn, in a state that a first display symbol 2 representing the current trip position of the corresponding transportation means is visually displayed on the electronic map of the display screen based on the position information from the GPS satellite SAT2, a second display symbol 4 representing the current position of the customer is displayed on the electronic map of the display screen based on a coordinate information contained in the map position data of the customer received from the mobile communication terminals E1 through En by the medium of the data interfaces F1 through Fn.

According to the third embodiment of the present invention, the transportation service by the transportation means will be described by taking an example of a taxi call service by a taxi. The host server HSV3 identifies the current trip position of each taxi by receiving the trip position information by the GPS satellite through the mobile communication terminals E1 through En provided at a plurality of taxis.

In this state, a customer who wants to ride a taxi connects to the host server HSV3 via a wireless communication network by dialing the phone number assigned to the taxi call service by operating the customer mobile communication terminal MP2, connects to the host server HSV3 via the public switched telephone network (PSTN) by operating the wired communication terminal TP2, or connects to the web site constructed at the host server HSV3 via the internet communication network by operating the network computer NC2. Then, the host server HSV3 receives customer position information by the GPS satellite SAT1 transmitted from the customer mobile communication terminal MP2, receives the position information of the corresponding customer by the operation of the mobile communication terminal TP2 by operating a self-constructed automatic voice response system ARS, or receives the customer position information in the form of web mail on the web site by the network computer NC2.

Meanwhile, in the state of detecting the current position of the corresponding customer through the position information received from the communication means of the customer, the host server HSV3 extracts information on the taxi being on a trip in areas adjacent to the current position of the customer by inquiring the information stored in the information database DB3 and then creates map position data for visually display the current position of the customer based on the position information of the customer.

Along with this, the host server HSV3 makes the communication means of the customer and the mobile communication terminal of the taxi establish a direct call connection by calling the mobile communication terminal of the taxi being on a trip in areas adjacent to the current position of the customer, and then transmits the map position data with the position information of the customer to the mobile communication terminal of the taxi.

Hence, the map position data received through the mobile communication terminal of the taxi is inputted into the vehicle navigation apparatus of the taxi by the medium of the data interface and is visually displayed on the electronic map of the display screen.

Accordingly, the transportation means can identify the current position of the customer visually indicated at the vehicle navigation apparatus G1 through Gn, and can go and pick up the customer within the shortest time along the path indicated on the electronic map.

Here, after a direct call connection is established between the customer mobile communication terminal MP2 and the mobile communication terminal installed at a predetermined transportation means for the purpose of information exchange for the execution of the transportation service, if it is detected that the position information transmitted from the customer mobile communication terminal MP2 and the mobile communication terminal of the transportation means by the GPS satellites SAT1 and SAT2 is disposed at the same position for a predetermined time, the host server HSV3 judges that the customer uses the transportation service with respect to the corresponding transportation means and then determines the trip fare received from the trip meter of the transportation means to be a fare serving as a cost for using the transportation service.

Next, a fourth embodiment of the present invention will be described in detail with reference to the accompanying drawings.

Figure 7:
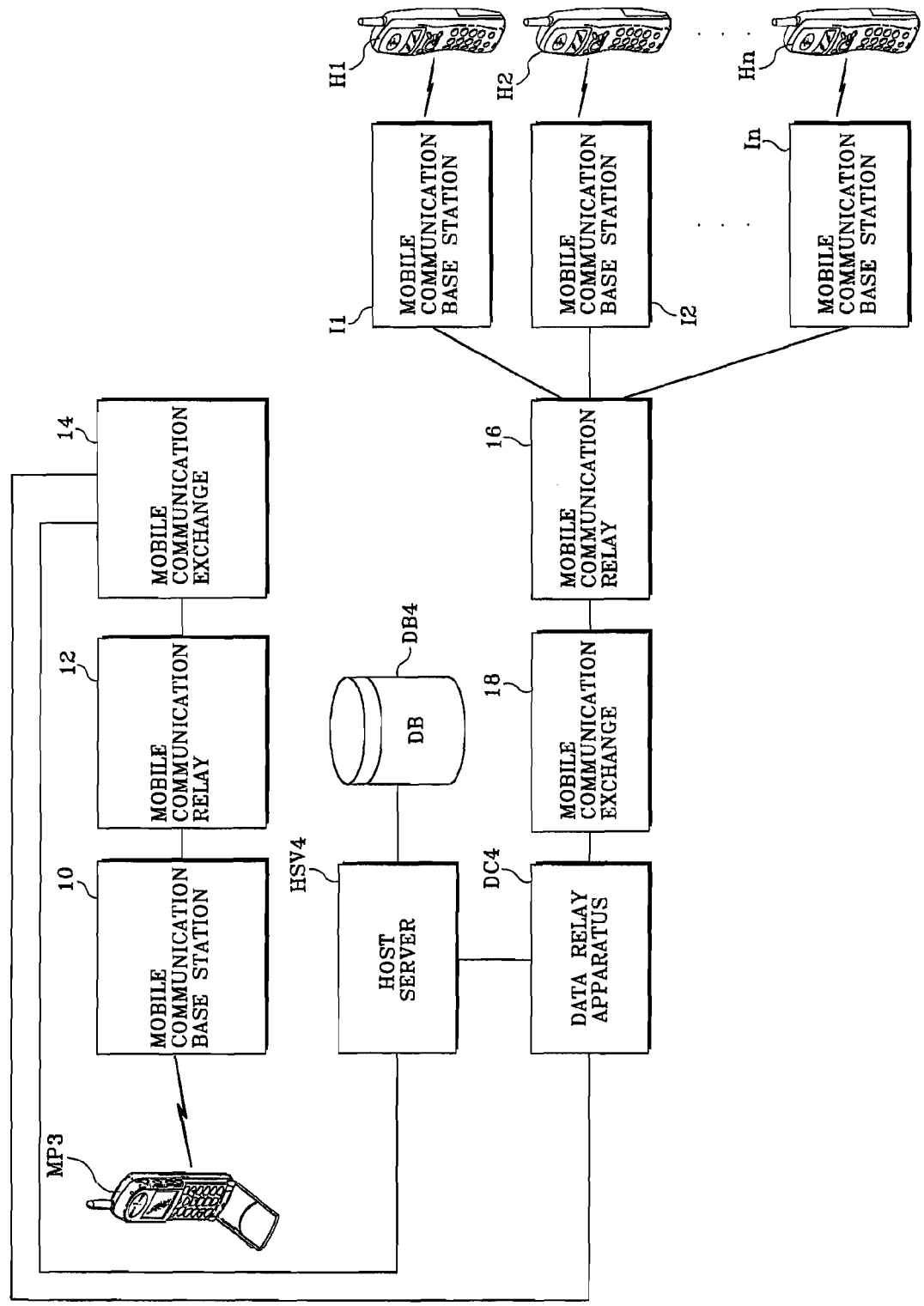
FIG. 7 is a view illustrating the overall construction of a system for processing transportation information using a communication network according to a fourth embodiment of the present invention.

That is, FIG. 7 is a view illustrating the overall construction of a system for processing transportation information using a communication network according to a fourth embodiment of the present invention.

As illustrated in FIG. 7, according to the fourth embodiment of the present invention, when a customer who wants to use a transportation service of the transportation means attempts a direct call connection to a predetermined transportation means by using a mobile communication terminal, the host server identifies the current position of the customer based on the position information of the mobile communication terminal of the customer detected from the wireless communication network, and then identifies the trip position of the corresponding transportation means by detecting the position of the mobile communication terminal provided at a plurality of transportation means, for thereby establishing a direct call connection between the customer and the transportation means on a trip in areas adjacent to the current position of the customer while transmitting character data for visually indicating the position of the corresponding customer to the mobile communication terminal of the transportation means according to the position information of the customer.

In the same drawing, a customer mobile communication terminal MP3 connects to the host server HSV4 via the wireless communication network by dialing the phone number assigned to the transportation service by the transportation means and makes a direct call connection to the mobile communication terminal of a predetermined transportation means called by the host server HSV4, for thereby achieving information exchange for a transportation contract.

A mobile communication base station 10 constituting the mobile communication network identifies the position of the corresponding customer mobile communication terminal by exchanging high frequency signals with the customer mobile communication terminal MP3 and transmits the identified position information on the customer mobile communication terminal MP3 to a mobile communication exchange 14 by the medium of a mobile communication relay 12.

The mobile communication exchange 14 provides the position information on the customer mobile communication terminal MP3 transmitted from the mobile communication base station 10 to the host server HSV4.

In the same drawing, a plurality of mobile communication terminals H1 through Hn provided at a plurality of transportation means proceeds a voice call by making a direct call connection to the customer mobile communication terminal MP3 by means of a speech call by the host server HSV4, and receives character data according to the position information of the customer transmitted from the host server HSV4 via the wireless communication terminal and visually displays them on a display unit.

A plurality of mobile communication relays I1 through In constituting the mobile communication network identifies the current position of a plurality of mobile communication terminal H1 through Hn by exchanging high frequency signals with each of the mobile communication terminals H1 through Hn and transmits the position information on the plurality of mobile communication terminals H1 through Hn to a mobile communication exchange 18 by the medium of a mobile communication relay 16.

The mobile communication exchange 18 provides the position information on each mobile communication terminal H1 through Hn received from each of the mobile communication terminals I1 through In through the mobile communication relay 16 to the host server HSV4 through the data relay apparatus DC4.

In a state that the host server HSV4 is connected to the customer mobile communication terminal MP3 through the mobile communication base station 10, the mobile communication relay 12 and the mobile communication exchange 14, the host server HSV4 identifies the current position of the corresponding customer based on the position information of the corresponding customer mobile communication terminal MP3 detected by the mobile communication base station 10. Then, the host server HSV4 calls the mobile communication terminal of the corresponding transportation means by extracting the information of the transportation means on a trip in areas adjacent to the current position of the customer according to the information stored in the information database DB4 and generates character data indicating the position of the corresponding customer according to the position information of the customer mobile communication terminal to thus transmit them to the mobile communication terminal of the transportation means.

Here, with respect to the host server HSV4, when the current position of the customer mobile communication terminal MP3 is detected by the mobile communication base station 10, an announcement message inquiring the corresponding customer mobile communication terminal MP3 of the permission of position detection through the mobile communication exchange 14 is transmitted in the form of character information (for example, an inquiry message "Are you going to transfer the information on your current position to a transportation vehicle?"). Then, when key input information permitting the position detection from the customer mobile communication terminal MP3 is received, character data indicating the position of the corresponding customer is transmitted to the mobile communication terminal of the transportation means.

The information database DB4 stores subscriber information on the plurality of transportation means and vehicle numbers and phone numbers for the mobile communication terminals H1 through Hn provided at each of the plurality of transportation means, updates and stores the trip position information received from the mobile communication terminals H1 through Hn of each transportation means every predetermined periods of time, stores data of geographical character information for creating character data for the position information of the customer and stores information on a charge as a cost for receiving the transportation service by the transportation means via the communication network.

Figure 4:
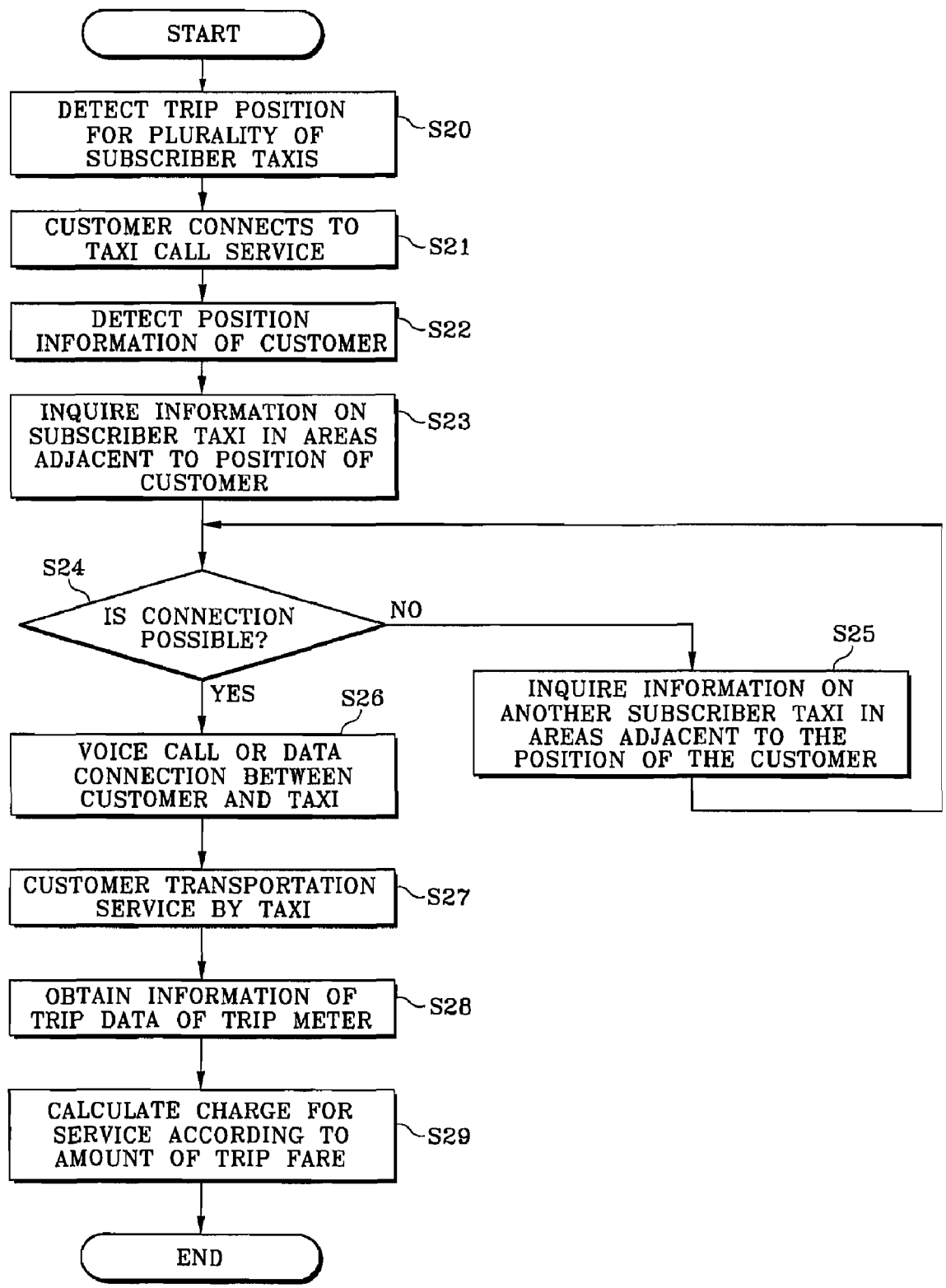
FIG. 4 is flow chart illustrating a method for processing transportation information using a communication network according to the second embodiment of the present invention.

Meanwhile, when the mobile communication terminals H1 through Hn provided at the plurality of transportation means receive character data for indicating the position of the customer from the host server HSV4, as illustrated in FIG. 4, the name of the region or building at which the customer is currently positioned is displayed on its respective display unit in the form of characters.

In the fourth embodiment of the present invention, the plurality of mobile communication terminals H1 through Hn can transmit empty vehicle information representing whether there exists an empty vehicle of each transportation means or not to the host server HSV1 via the mobile communication terminals I1 through In, the mobile communication relay 16, the mobile communication exchange 18 and the data relay apparatus DC4 by the operation of a special functional button. The host server HSV4 makes a direct call connection to the customer by giving an effective function of the transportation service only to the mobile communication terminal that has transmitted the empty vehicle information among the plurality of mobile communication terminals H1 through Hn.

Furthermore, after a direct call connection is established between the customer mobile communication terminal MP2 and the mobile communication terminal installed at a predetermined transportation means for the purpose of information exchange for the execution of the transportation service, if it is detected that the customer position information on the customer mobile communication terminal and the trip position information on the mobile communication terminal of the transportation means each detected from a predetermined mobile communication terminal are identical or similar to each other for a predetermined time, the host server HSV2 judges that the customer uses the transportation service with respect to the corresponding transportation means and then imposes a charge for the transportation service.

Continuously, the operation according to the fourth embodiment of the present invention will now be described in detail with reference to the accompanying drawings.

In the fourth embodiment of the present invention, the transportation service by the transportation means will be described by taking an example of the taxi call service by the taxi.

Firstly, when the mobile communication terminals H1 through Hn exchanges high frequency signals with each mobile communication terminals I1 through In even in the state that a call is off, the plurality of mobile communication terminals I1 through In can identify the current position for each mobile communication terminal H1 at any time through Hn by the function of exchanging high frequency signals and such a position information is transmitted to the data relay apparatus DC4 through the mobile communication relay 18 and the mobile communication exchange 18.

At this time, the mobile communication terminal of the taxi being on a trip in an empty state for executing the taxi call service among the plurality of mobile communication terminals H1 through Hn transmits empty vehicle information to the host server HSV4 through a predetermined mobile communication base station, the mobile communication relay 16, the mobile communication exchange 18 and the data relay apparatus DC4. The host server HSV4 sets a direct call connection with the customer mobile communication terminal MP3 to be effective only with respect to the mobile communication terminal that has transmitted the empty vehicle information.

In this state, in a case that a certain customer who wants a taxi call service connects to the host server HSV4 through the mobile communication base station 10, the mobile communication relay 12 and the mobile communication exchange 14 by operating the customer mobile communication terminal MP3, the mobile communication base station 10 identifies the current position for the corresponding mobile communication terminal MP3 by exchanging high frequency signals with the customer mobile communication terminal MP3 and such a position information is transmitted to the host server HSV4 through the mobile communication relay 12 and the mobile communication exchange 14.

In the state that the host server HSV4 is connected to the customer mobile communication terminal HSV4 via the wireless communication network, the host server HSV4 identifies the current position of the corresponding customer through the position information on the customer mobile communication terminal MP3 received from the mobile communication base station 10, extracts the information of the taxi being on a trip in areas adjacent to the current position of the customer according to the information stored in the information database DB4, and then attempts the calling of the mobile communication terminal of the corresponding taxi through the data relay apparatus DC4.

Along with this, the host server HSV4 generates character data indicating the position information of the customer according to the geographical character information of the information database DB4 and then transmits the character data to the mobile communication terminal of the taxi being on a trip in areas adjacent to the current position of the customer through the data relay apparatus DC4.

Meanwhile, the mobile communication terminal of the taxi being on a trip in areas adjacent to the current position of the customer proceeds a voice call by making a direct call connection to the customer mobile communication terminal MP3 through the mobile communication exchange 18, the mobile communication relay 16 and the mobile communication base station according to a call attempt by the data relay apparatus DC4, and simultaneously receives character data indicating the current position of the corresponding customer to thus display them visually on a display unit.

Hence, the driver of the taxi can identify the current position of the corresponding customer rapidly through the character information displayed on the display unit while executing the voice call with the customer who wants to use the taxi.

At this time, if it is detected that the customer position information on the customer mobile communication terminal MP3 detected through a predetermined mobile communication terminal and the trip position information on the mobile communication terminal provided at the taxi are identical or similar to each other for a predetermined time, the host server HSV4 judges that the customer has got a ride into the taxi to use the taxi call service for thereby demanding a charge for the transportation service.

Next, a fifth embodiment of the present invention will now be described in detail with reference to the accompanying drawings.

Figure 9:
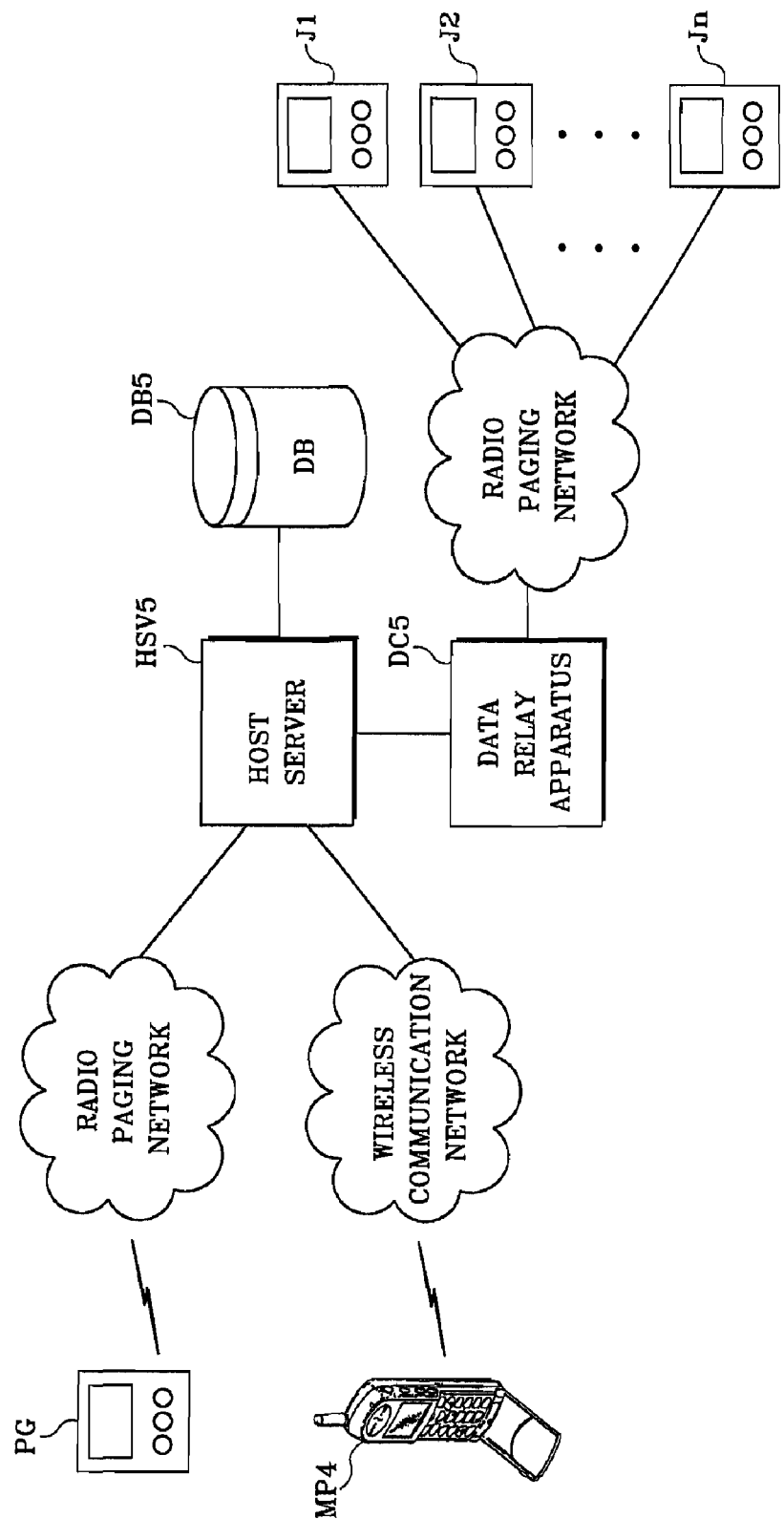
FIG. 9 is a view illustrating the overall construction of a system for processing transportation information using a communication network according to a fifth embodiment of the present invention.

That is, FIG. 9 is a view illustrating the overall construction of a system for processing transportation information using a communication network according to the fifth embodiment of the present invention.

As illustrated in FIG. 9, according to the present invention, a bi-directional radio pager is installed at the transportation means providing a predetermined transportation service, the trip position of each transportation means is identified through the bidirectional radio pager, and then a message for requesting the transportation service from the communication means of the customer is transmitted to the bidirectional radio pager, for thereby enabling a connection between the customer and the service of the transportation means.

In the same drawing, the bi-direction radio pager (PG) for the customer is provided with a service call function for calling the transportation service by the transportation means, and connects to a host server HSV5 via a radio paging network to thus performs a call for requesting the use of the transportation service.

Meanwhile, the radio paging network detects the current position of the customer radio pager (PG) to thus transmit the position information of the customer to the host server HSV5.

In addition, a customer mobile communication terminal MP4 connects to the host server HSV5 via a wireless communication network to thus transmit a message for requesting the transportation service in the form of voice.

Here, the mobile communication base station provided at the wireless communication network detects the current position of the customer mobile communication terminal MP4, and a mobile communication exchange creates the position information of the customer to thus transmit them to the host server HSV5.

When the host server HSV5 receives the call for requesting the use of the transportation service from the customer bidirectional radio pager (PG) and receives the current position information of the customer bi-directional radio pager (PG) via the radio paging network, it searches for a bi-directional radio pager of the transportation means being on a trip in areas adjacent to the current position of the customer and informs the bi directional radio pager of the transportation means of the transportation service request information of the customer and the current position information of the customer by a character message.

In addition, when the host server HSV5 receives the call for requesting the use of the transportation service from the customer mobile communication terminal MP4 and receives the current position information of the corresponding customer mobile communication terminal MP4 via the wireless communication network, it searches for a bi-directional radio pager of the transportation means being on a trip in areas adjacent to the current position of the customer and informs the bi-directional radio pager of the transportation means of the transportation service request information of the customer and the current position information of the customer by a character message.

In the same drawing, the information database DB5 stores subscriber information on the plurality of transportation means and vehicle numbers and phone numbers for the bi-directional radio pagers J1 through Jn provided at each of the plurality of transportation means, updates and stores the trip position information received from the bidirectional radio pagers J1 through Jn of each transportation means every predetermined periods of time, stores data of character information for creating character data on the position information of the customer and stores information on a charge as a cost for receiving the transportation service by the transportation means via the communication network.

Moreover, in the state that the trip position information obtained by detecting the current position of each radio pager via the radio paging network is transmitted to the host server HSV5, the bi-directional radio pagers J1 through Jn provided at the transportation means receives the message according to the customer's request for the use of the transportation service and the character message indicating the current position of the customer for thereby visually displaying them on each liquid display screen.

Here, the plurality of bidirectional radio pagers J1 through Jn can transmit empty vehicle information representing whether there exists an empty vehicle of each transportation means or not to the host server HSv1 via the wireless communication network and the data relay apparatus DC5 by the operation of a special functional button. The host server HSV1 enables a direct call connection to the customer by giving an effective function of the transportation service only to the mobile communication terminal that has transmitted the empty vehicle information among the plurality of bi-directional radio pagers J1 through Jn.

In addition, in a state that the information of the request for using the transportation service from the customer bi-directional radio pager (PG) or the customer mobile communication terminal MP4 is transmitted to the bi-directional radio pager installed at a predetermined transportation means, if it is detected that the customer position information on the customer bi-directional radio pager (PG) or customer mobile communication terminal MP4 each detected from the radio paging network or and the mobile communication terminal base station of the wireless network and the trip position information on the bidirectional radio pager of the transportation means are identical or similar to each other for a predetermined time, the host server HSV2 judges that the customer uses the transportation service with respect to the corresponding transportation means and then imposes a charge for the transportation service.

Next, a sixth embodiment of the present invention will be described in detail with reference to the accompanying drawings.

Figure 10:
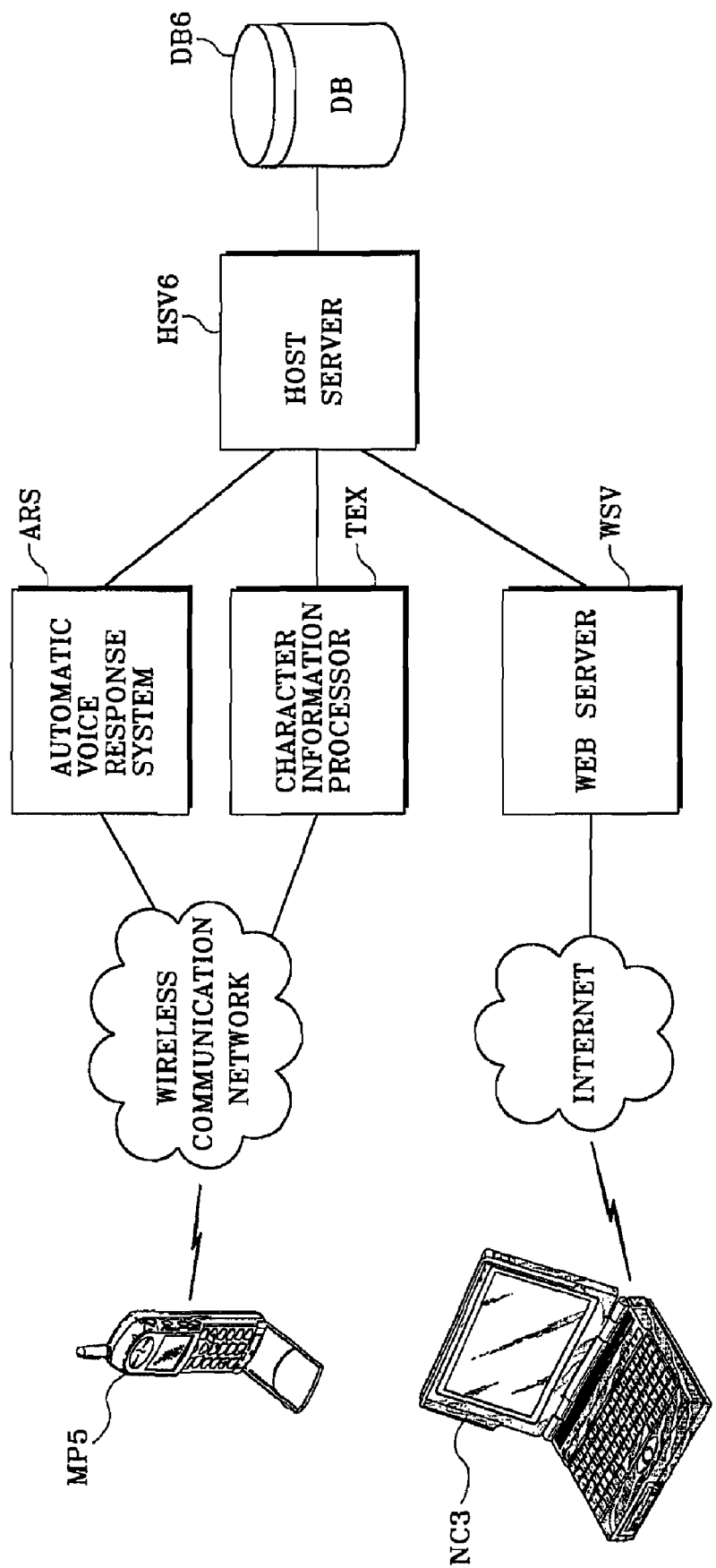
FIG. 10 is a view illustrating the overall construction of a system for processing transportation information using a communication network according to a sixth embodiment of the present invention.

FIG. 10 is a view illustrating the overall construction of a system for processing transportation information using a communication network according to a sixth embodiment of the present invention.

As illustrated in FIG. 10, according to the sixth embodiment of the present invention, when a customer who wants to use a mass transportation means such as an urban bus or subway connects to the host server via the wireless communication network by using the mobile communication terminal or via the internet communication network by using the network computer and inputs a destination from the current position, the host server transmits general route guide information on mass transportation routes from the current position to the destination with respect to the customer mobile communication terminal by an automatic voice response function or character information transfer function. While the network computer provides the route guide information through a dedicated web site in the form of web information.

In the same drawing, the customer mobile communication terminal MP5 can connect to the host server HSV6 via the wireless communication network to thus receive the route guide information on the mass transportation route in the form of voice by the automatic voice response system (ARS), or in the form of character information by a character information processor TEX.

Since the automatic voice response system (ARS) can be operated selectively according to a selective operation of the customer mobile communication terminal MP5, the host server HSV6 can process short time traffic route information from the current position of the customer to the destination as voice information and transmits them to the customer mobile communication terminal MP5.

In addition, since the character information processor TEX can be operated selectively apart from the automatic voice response system ARS by selectively operating the customer mobile communication terminal MP5, the traffic route information from the current position of the corresponding customer to the destination that are produced from the host server HSV6 are processed into character data to be transmitted to the customer mobile communication terminal.

In the same drawing, the network computer NC3 is provided with a wired or wireless modem required for an internet connection and a browser program dedicated to web search, and can connect to the web sited constructed at the web server WSV via the internet communication network and then inquire the short time traffic route information on the route from the current position and destination of the customer in the form of multimedia information.

The web server WSV provides the traffic route information on the route from the current position and destination of the customer who owns the network computer in the form of multimedia information such as characters, images and voices.

In the same drawing, an information database DB6 stores various mass transportation information including routes for transportation means such as urban buses, suburban buses, subway and the like distributed over the cities, provinces and districts of the country, a trip time, a trip fare, a time required and the like.

In a state that the host server HSV6 is connected to the customer mobile communication terminal MP5 via the wireless communication network or is connected to the network computer NC3 via the internet communication network, if the host server HSV6 receives the information on the route from the current position of the customer to the destination, it generates route guide information of the mass transportation means capable of moving to the destination in a short time according to the mass transportation information stored in the information database to thus provide them to the corresponding customer.

Meanwhile, in a state that a customer wanting to move to a predetermined destination is connected to the host server HSV6 through the mobile communication terminal MP5, an announcement message requesting for inputting the current position and destination of the corresponding customer is sent in the automatic voice response method by the automatic voice response system. Thus, it is possible to identify the current position and destination name of the corresponding customer by a key code signal of Hangul format combined by a selective operation of a numeric key and a functional key provided at the customer mobile communication terminal MP5.

Here, in a case that the character information processor TEX processes the route guide information of the customer provided from the host server HSV6 in the form of character information, as illustrated in FIG. 11, a bus route, subway route or a combination of bus and subway routes by which the movement from the current position of the customer to the destination is achieved within a short time are displayed in the form of characters on a display unit of the customer mobile communication terminal MP5, and also additional information such as a fare and time required for each transportation means are displayed thereon along with the guide of the mass transportation routes.

Figure 12:
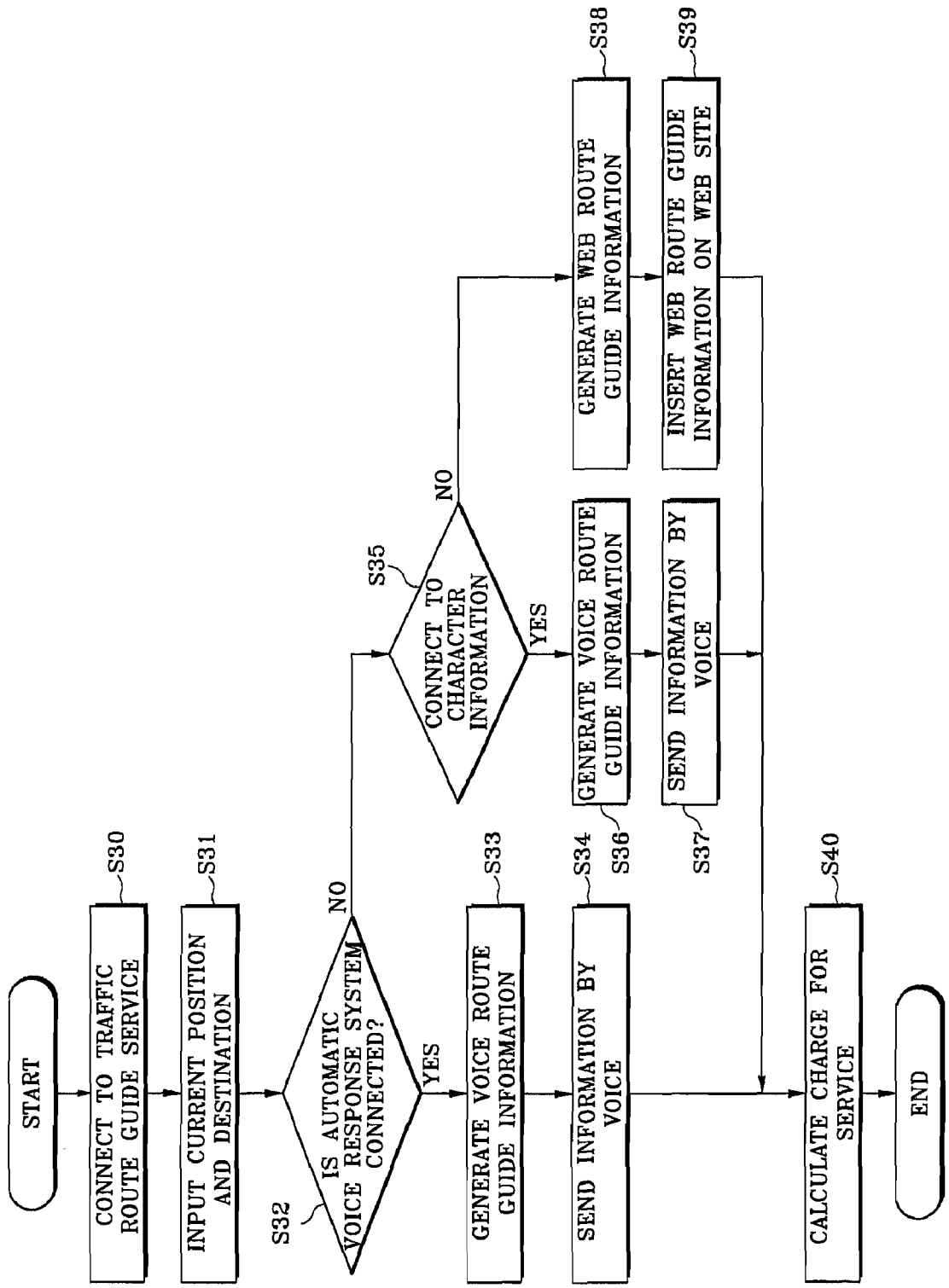
FIG. 12 is a flow chart illustrating a method for processing transportation information using a communication network according to the sixth embodiment of the present invention.

Continuously, the sixth embodiment of the present invention will now be described in detail with reference to the flow chart of FIG. 12.

Firstly, a customer who wants to move to a predetermined destination by using a transportation means connects to the host server HSV6 via the wireless communication network by dialing the telephone number assigned to the announcement service of the mass transportation route by operating the mobile communication terminal MP5, or connects to the web site constructed at the web server WSV via the internet network by using the network computer NC3 (in step S30).

In this state, when the customer connects to the host server HSV6 through the mobile communication terminal MP5, the host server HSV6 requests the customer to select whether he or she is going to inquire the route guide information of a mass transportation means in the automatic voice response method or to inquire the same in the form of character information and sends an announcement message for requesting for inputting the current position and destination of the customer by voice.

Hence, the mobile communication terminal MP5 generates a key code signal of Hangul format combined by a selective operation of a numeric key and a functional key and then the host server HSV6 can identify the current position and destination of the customer by the key code signal from the mobile communication terminal.

On the contrary, in a case that the customer connects to the web site of the web server WSV by using the network computer NC3, it is possible to identify the current position and destination of the corresponding customer by the input information on the current position and destination inputted on the web site (in step S31).

Accordingly, the host server HSV6 inquires the information stored in the information database DB6 based on the information on the current position and destination of the customer and generates route guide information for guiding the best transportation service movable to the destination within a short time.

Meanwhile, the host server HSV6 judges whether or not the customer executes a selective operation for inquiring the route guide information of the mass transportation routes in the automatic voice response method by the automatic voice response system ARS by using the mobile communication terminal MP5 (in step S32).

As the result of judging, if it is detected that the customer has executed a selective operation for requesting for route guide information in the automatic voice response method by using the mobile communication terminal MP5, the host server HSV6 processes the route guide information of a mass transportation route in the form of voice information (in step S33), and then sends the same to the customer mobile information terminal MP5 via the wireless communication network (in step S34).

Meanwhile, according to the result of judging in the step S32, if it is detected that the customer has not executed a selective operation for requesting for route guide information in the automatic voice response method by using the mobile communication terminal MP5, it is judged whether or not the selective operation for requesting the information in the form of character information by the character information processor TEX (in step S35).

As the result of judging, if it is detected that the customer has executed a selective operation for requesting for route guide information in the form of character information by using the mobile communication terminal MP5, the route guide information is converted into character data by the character information processor TEX (in step S36), and it is sent in the form of characters on a display unit of the mobile communication terminal MP5 via the wireless communication network (in step S37).

On the contrary, as the result of judging in the step S35, if it is detected that the customer does not use the mobile communication terminal MP5, it is judged that the customer connects to the web site constructed at the web server WSV via the internet communication network by operating the network computer NC3. Thus, the host server HSV6 processes the route guide information in the form of web information of multimedia type (in step S38) and inserts the route guide information of the web information form on the web site so that the route guide information can be inquired by the network computer NC3 (in step S39).

As the result, after the execution of the steps S34, S37 and S39, the host server HSV6 estimates a charge for the inquiry of the route guide information on the mass transportation route with respect to the network computer NC3 (in step S40).

Next, a seventh embodiment of the present invention will now be described in detail with reference to the accompanying drawing.

Figure 13:
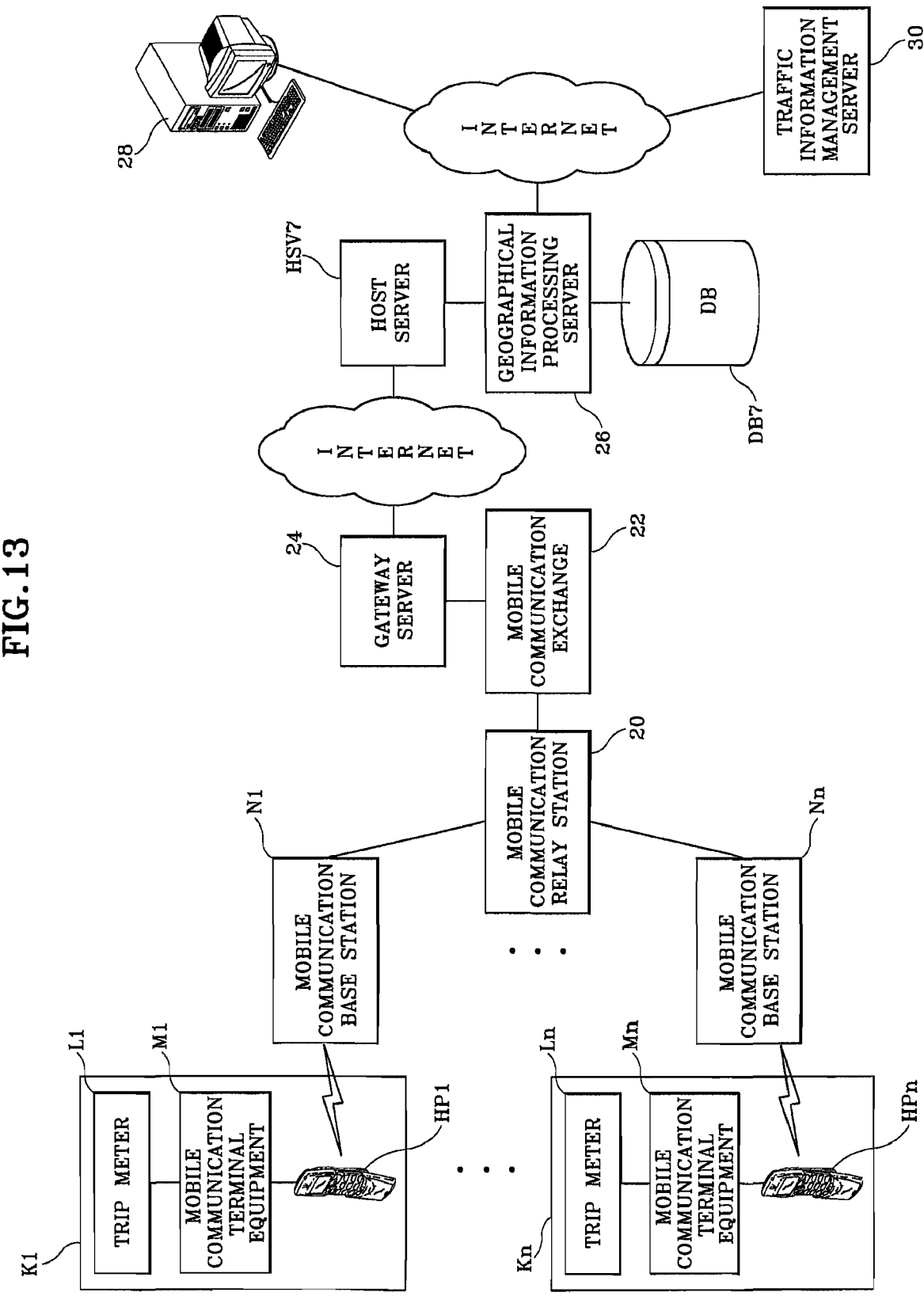
FIG. 13 is a view illustrating the overall construction of a system for processing transportation information using a communication network according to a seventh embodiment of the present invention.

That is, FIG. 13 is a view illustrating the overall construction of a system for processing transportation information using a communication network according to a seventh embodiment of the present invention.

As illustrated in FIG. 13, the system for processing transportation information using a communication network according to a seventh embodiment of the present invention includes: a plurality of trip meters L1 through Ln, a plurality of mobile communication terminal equipment M1 through Mn and mobile communication terminals HP1 through HPn installed at a plurality of transportation vehicles K1 through Kn such as taxis; a plurality of mobile communication base stations N1 through Nn; a mobile communication relay station 20; a mobile communication exchange 22; a gateway server 24; a host server HSV7; a geographical information processing server 26; an information database DB7; a personal computer terminal 28; and a traffic information management server.

In the same drawing, the plurality of trip meters L1 through Ln are configured to estimate a trip fare by calculating the trip time and trip distance for each transportation means K1 through Kn such as a taxi, and it transmit the information on the trip time and trip distance for estimating the trip fare to each mobile communication terminal HP1 through HPn via each mobile communication terminal M1 through Mn.

The plurality of mobile communication terminal equipment M1 through Mn transmits the information on the trip time and trip distance from each trip meter L1 through Ln to each mobile communication terminal HP1 through HPn by connecting each trip meter L1 through Ln and the mobile communication terminal HP1 through HPn.

In addition, the plurality of mobile communication terminals HP1 through HPn are provided at each transportation means K1 through Kn. When they receive the information on the trip time and trip distance from each trip meter L1 through Ln through the mobile communication terminal M1 through Mn, the host server HSV7 transmits the information on the trip time and trip distance wirelessly by executing a call connection to the phone number assigned to the host server HSV7.

In the same drawing, the plurality of mobile communication base stations N1 through Nn are arranged and distributed in a plurality of areas in which the transportation vehicles K1 through Kn can travel and perform information communication wirelessly with each mobile communication terminal HP1 through HPn mounted in the corresponding transportation vehicle K1 through Kn while generating position information by detecting the position of each mobile communication terminal HP1 through HPn.

The mobile communication relay station 20 is configured to relay information exchanged between the plurality of mobile communication base stations N1 through Nn and the mobile communication exchange 22. The mobile communication exchange 22 executes a call connection to the phone number assigned to the host server HSV7 according to a call connection attempt of each mobile communication terminal HP1 through HPn and transmits the information on the trip time and trip distance for each transportation means K1 through Kn provided from each mobile communication terminal HP1 through HPn and the position information of the mobile communication terminal HP1 through HPn detected by the mobile communication base station N1 through Nn to the host server HSV7.

The gateway server 24 is configured to convert the protocol of information data exchanged between the mobile communication exchange 22 and the host server HSV7 via the internet communication network.

The host server HSV7 receives the information on the trip time and trip distance from each mobile communication terminal HP1 through HPn transmitted from the mobile communication exchange 22 and the position information of the mobile communication terminal HP1 through HPn detected by the mobile communication base station N1 through Nn in the form of internet web information. The geographical information processing server 26 generates electronic map information in the form of internet web information based on the information on the trip time and trip distance based on the position information of each mobile communication terminal HP1 through HPn received from the host server HSV7 (that is, the position information for each transportation means K1 through Kn).

Here, the electronic map information created by the geographical information processing server 26 are provided in the form of character/number information so that the average trip speed for vehicles in each road section and the traffic jam state for each section can be visually checked according to the position information of the mobile communication terminal HP1 through HPn and the data estimated for the trip time and distance.

The information database DB7 stores the position information of each transportation means K1 through Kn received through the host server HSV7 and the information on the trip time and trip distance, and stores data values of the electronic map information created based on such information.

Meanwhile, in the same drawing, at the personal computer terminal 28, it is possible to connect to the map information web site of the geographical information processing server 26 via the internet communication network, to receive the web page data of the electronic map information for the traffic jam state for a desired road section from the geographical information processing server 26 and to inquire the same visually.

Here, a personal user who has subscribed for a general subscriber with respect to the geographical information processing server 26 is allowed to use the personal computer terminal 28 for an inquiry of the electronic map information.

In addition, the traffic information management server 30 connects to the geographical information processing server 26 via the internet communication network and receives the electronic map information on the average trip speed for the plurality of transportation means K1 through Kn and on the traffic jam state, for thereby utilizing the electronic map information as information data required for the management of traffic information.

According to the seventh embodiment of the present invention, when the information on the trip time and trip speed for the plurality of transportation vehicles K1 through Kn traveling frequently in a wide range of a road section such as taxis through the mobile communication terminals HP1 through HPn mounted in the corresponding transportation vehicle K1 through Kn and the information on the current position for each mobile communication terminal HP1 through HPn is detected, the geographical information processing server 26 generates electronic map information obtained by estimating average trip speed and for vehicles and finding a traffic jam section based on the position information on the trip time and trip distance on the plurality of transportation vehicles K1 through Kn and the position information.

In this state, the geographical information processing server 26 provides the electronic map information with the information on the average trip speed for the transportation vehicles K1 through Kn and a traffic jam section to a predetermined personal computer terminal 28 or traffic information management server 30 in on-line via the internet communication network, for thereby allowing the personal user to utilize the traffic information for a personal use or allowing the traffic information management server 30 to utilize the electronic map information for the traffic information management for a public use.

Next, an eighth embodiment of the present invention will now be described in detail with reference to the accompanying drawing.

Figure 14:
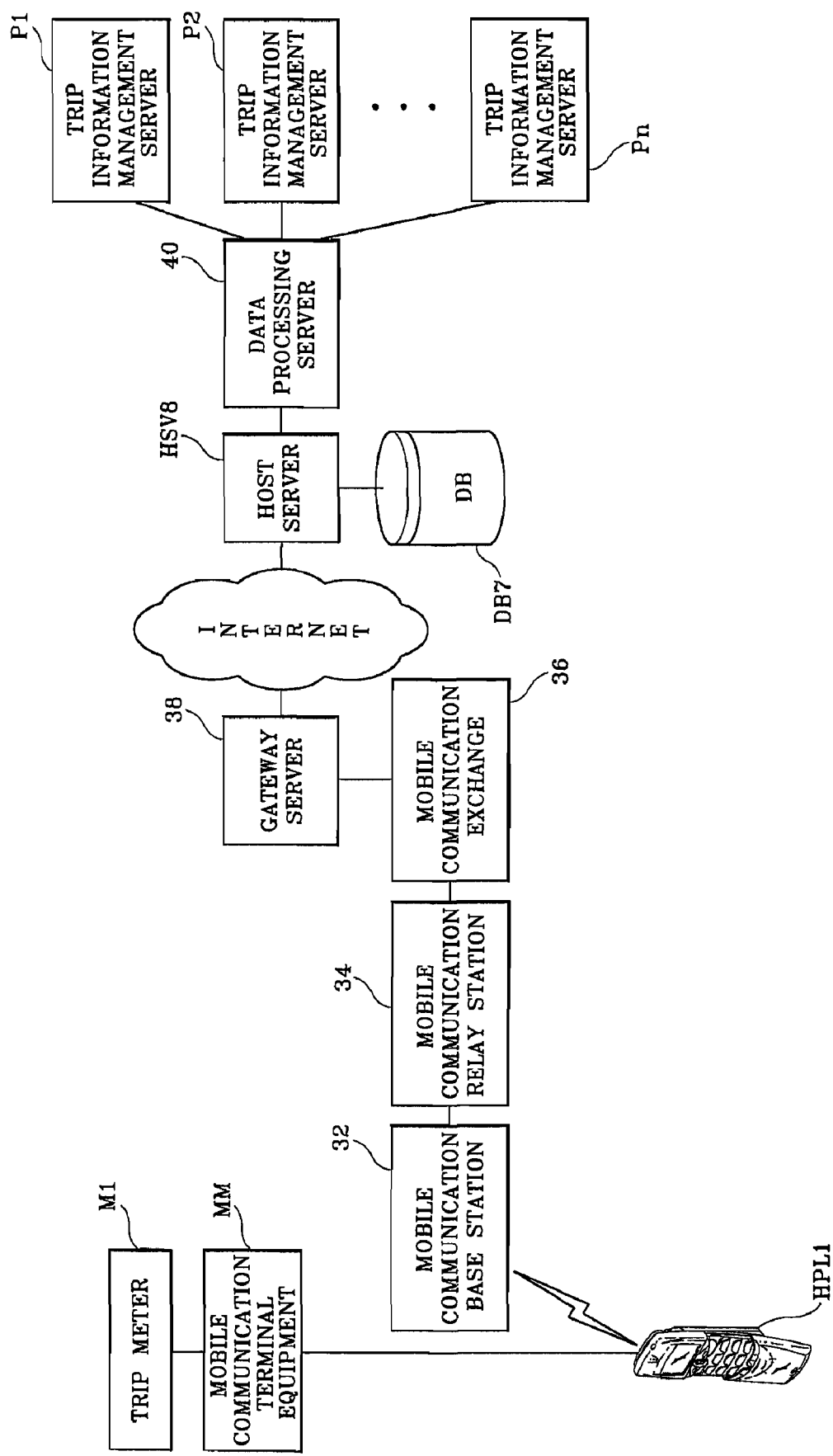
FIG. 14 is a view illustrating the overall construction of a system for processing transportation information using a communication network according to the seventh embodiment of the present invention.

That is, FIG. 14 is a view illustrating the overall construction of a system for processing transportation information using a communication network according to the seventh embodiment of the present invention.

As illustrated in FIG. 14, the system for processing transportation information using a communication network according to a seventh embodiment of the present invention includes: a trip meter LL, a mobile communication terminal equipment MM and a mobile communication terminal HPL1 mounted in a predetermined transportation vehicle; a mobile communication base station 32; a mobile communication relay station 34; a mobile communication exchange 36; a gateway server 38; a host server HSV8; an information database DB7; a data processing server 40; and a plurality of trip information management servers P1 through Pn.

The trip meters LL is mounted in a transportation vehicle such as a taxi and estimates a trip fare by calculating the trip time and trip distance in a state that a customer rides into the corresponding transportation vehicle or a predetermined cargo is loaded on the transportation vehicle, and transmits the information on the trip time and trip distance for estimating the trip fare to the mobile communication terminal HPL1 through the mobile communication terminal equipment MM.

The mobile communication terminal equipment MM transmits the information on the trip time and trip distance from the corresponding trip meter LL to the mobile communication terminal HPL by connecting the trip meter LL and the mobile communication terminal HPL1.

In addition, when the mobile communication terminal HPL1 receives the trip time and trip distance from the trip meter LL through the mobile communication terminal equipment MM, it executes a call connection to the phone number assigned to the host server HSV8 to thus transmit the information on the trip time and trip distance.

Here, the mobile communication terminal HPL1 is provided with a display means (not shown) consisting of a thin display device such as LCD for visually displaying the information received through the mobile communication network. When it receives a certain information from the host server HSV7, it is preferable that the display means is operated to flash repeatedly in order to visually display the receiving state of the information.

In the same drawing, the mobile communication base station 32 executes information communication wirelessly with the mobile communication terminal HPL1 mounted in the transportation vehicle and generates position information by detecting the position of the corresponding mobile communication terminal HPL1.

The mobile communication relay station 34 relays the information exchanged between the mobile communication base station 32 and the mobile communication exchange 36. The mobile communication exchange 36 executes a call connection to the telephone number assigned to the host server HSV8 according to a call connection attempt of the mobile communication terminal HPL1 and transmits the information on the trip time and trip distance of a state that the customer rides into the corresponding transportation vehicle or a predetermined cargo is loaded and the position information of the mobile communication terminal HPL1 detected by the mobile communication base station 32 to the host server HSV8.

The gateway server 38 is configured to convert the protocol of information data exchanged between the mobile communication terminal 36 and the host server HSV8 via the internet communication network.

The host server HSV8 receives the information on the trip time and trip distance from the mobile communication terminal HPL1 transmitted from the mobile communication exchange 36 and the position information of the mobile communication terminal HPL1 detected by the mobile communication base station 32 in the form of internet web information through the internet communication network.

The data processing server 40 generates various information data such as trip fare information, vehicle management information, information on trip rates by sections according to the information on the trip time and trip distance received from the host server HSV8, that is, the information on the trip time and trip distance in a state that the customer rides into the corresponding transportation vehicle or a predetermined cargo is loaded and the position information of the corresponding transportation vehicle and provides the related information to the post of the transportation means having the mobile communication terminal HPL1 mounted therein by on-line.

In the same drawing, a plurality of trip information management servers P1 through Pn are installed at, for example, a taxi company, a freight transportation company, a designated repair shop and the like and connects to the data processing server 40 via the internet communication network or private line network, for thereby receiving various processed information such as trip fare information on the corresponding transportation vehicle, vehicle management information, information on trip rates by sections and the like by on-line and utilizing the same as management policy information, vehicle repair management information and the like.

According to the eighth embodiment of the present invention, for example, in a case that a predetermined transportation vehicle serving as a taxi is being on a trip with a customer got into the taxi, the trip meter LL calculates the trip time and trip distance of the corresponding transportation vehicle and transmits the related information to the mobile communication terminal HPL1 through the mobile communication terminal equipment MM. Then, the mobile communication terminal HPL1 transmits the information on the trip time and trip distance received from the trip meter LL wirelessly by executing an automatic call connection to the phone number assigned to the host server HSV8.

Meanwhile, by executing wireless communication with the mobile communication terminal HPL1, the mobile communication base station 32 transmits the information on the trip time and trip distance of the transportation vehicle and generates the position information obtained by detecting the position of the mobile communication terminal HPL1.

Accordingly, the mobile communication exchange 36 transmits the information on the trip time and trip distance received from the mobile communication base station 32 and the position information to the host server HSV8 through the gateway server 38. Then, the data processing server 40 generates information data such as trip fare information, vehicle management information, information on trip rates by sections according to the information on the trip time and trip distance and the position information of the corresponding transportation vehicle received from the host server HSV8.

Various information data generated by the data processing server 40 are transmitted to the trip information management server corresponding to the plurality of trip information management server P1 through Pn according to the characteristics of information.

Next, a ninth embodiment of the present invention will now be described in detail with reference to the accompanying drawing.

Figure 15:
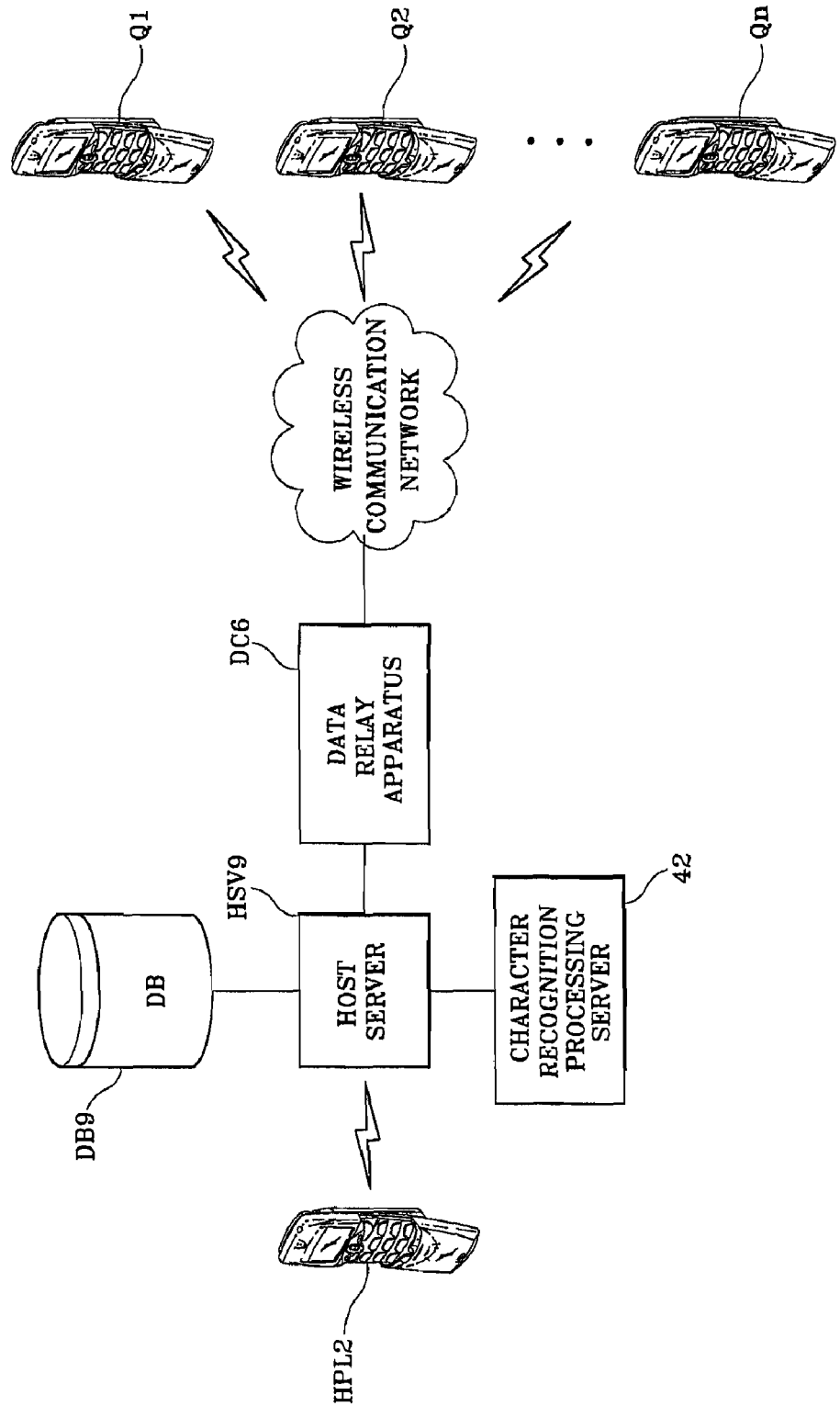
FIG. 15 is a view illustrating the overall construction of a system for processing transportation information using a communication network according to an eighth embodiment of the present invention.

FIG. 15 is a view illustrating the overall construction of a system for processing transportation information using a communication network according to a ninth embodiment of the present invention.

As illustrated in FIG. 15, the system for processing transportation information using a communication network according to the ninth embodiment of the present invention includes: a customer mobile communication terminal HPL2; a host server HSV9; an information database DB9, a character recognition processing server 42, a data relay apparatus DC6 and a plurality of vehicle mobile communication terminals Q1 through Qn.

In the same drawing, the customer mobile communication terminal HPL2 executes a call connection to the host server HSV9 through the wireless communication network for thereby transmitting character message information for indicating the position of the customer by the customer's key input operation.

The host server HSV9 receives character message information from the mobile communication terminal HPL2 via the wireless communication network. Then, when the current position of the customer mobile communication terminal HPL2 is detected by the character recognition processing server 42, the mobile communication terminal of the transportation vehicle adjacent to the position of the mobile communication terminal HPL2 among the plurality of mobile communication terminals Q1 through Qn for transportation vehicles is called for establishing a call connection to the customer.

In a state that the phone numbers for the plurality of mobile communication terminals Q1 through Qn for transportation vehicles and local code information of the corresponding area of each transportation vehicle, the information database DB9 stores character message information received from the host server HSV9 along with phone number information of the corresponding mobile communication terminal HPL2, and stores the character message information from the mobile communication terminals Q1 through Qn for each transportation vehicle.

The character recognition processing server 42 detects the current position of the corresponding customer mobile communication terminal HPL2 and the trip position of the mobile communication terminals Q1 through Qn of the transportation vehicle by recognizing characters contents on the character message information received from the host server HSV9, transmits the position information detected as the result of the character recognition processing of the character recognition processing server 42 to the mobile communication terminal for a predetermined transportation vehicle via the wireless communication network, and enables a call connection with the customer mobile communication terminal HPL2.

In the same drawing, the plurality of mobile communication terminals Q1 through Qn for transportation vehicles are mounted in the transportation vehicle such as a taxi, and creates character message information indicating the current trip position of each transportation vehicle to transmit the same to the host server HSV9, for thereby achieving a direct call connection with the customer mobile communication terminal HPL2.

Here, in a case that the corresponding transportation vehicle is initially registered in the host server via the wireless communication network, the plurality of mobile communication terminals Q1 through Qn for transportation vehicles transmits the phone number of each mobile communication terminal and the local code information of the area to which each transportation vehicle belongs to (for example, a local code of the area to which a taxi company belongs) to the host server HSV9 via the wireless communication network.

While the invention has been shown and described with reference to certain preferred embodiments thereof, it will be understood by those skilled in the art that various changes in form and details may be made therein without departing from the spirit and scope of the invention as defined by the appended claims.

In the above embodiment of the present invention, the transportation service and route guide service of the present invention is embodied by using a mobile communication terminal capable of voice call or character data exchange or an internet telephone function, and also it is possible to adapt those services to, for example, a videophone capable of call by voices, still images and dynamic images such as IMT2000.

In addition, the transportation service according to the above embodiments of the present invention can be adapted to a taxi call service by a taxi, and also can be adapted to a vehicle transfer service by a repair shop in charge of a repair work of an accident car, or a car rental service for a sightseeing bus or small or medium sized lent car.

Moreover, with respect to the transportation service of the present invention according to the embodiment of the present invention, it is preferable to rapidly and correctly establish a direct call connection and position detection for the use of the service between a transportation means and a consignor by giving the functions of the present invention to a door-to-door delivery service by a delivery vehicle mainly used for the transportation of a small-sized cargo.

Furthermore, in the embodiment of the present invention, a call connection for the transportation service between a customer and a transportation vehicle is automatically made by a host server. If a certain telephone operator is present between the communication terminal of the corresponding customer and the host server and the telephone operator receives the current position and destination of the customer by a call operation, the telephone operator enters in character information such as the position, destination and phone number of the customer and by a call connection with the communication terminal of the transportation vehicle through the host server and the characters for the position of the customer among the character information entered by the telephone operator are recognized by the operation of the program driven by the host server. While, it is also possible to rapidly and ultimately connect the customer and the transportation vehicle by searching for the transportation vehicle adjacent to the position of the corresponding customer and transmitting the result of the search to the communication terminal of the transportation vehicle in the form of character messages.

As seen from above, according to the present invention, since a customer who wants to use the transportation service by the transportation means such as the taxi call service, the car rental service or the repair service for an accident car by a repair shop can use the transportation service of a desired transportation means by a single direct call connection without a service subscription through a consultant or a repetitive communication between both parties, a more rapid connection to the service is enabled. Furthermore, since the cost required for the employment of consultants and the repetitive call connection between the transportation means and the customer is reduced, a service of low cost can be realized.

In addition, in the present invention, since the position of a customer who wants a transportation service and the trip position of a transportation means in charge of transportation can be identified easily, it is possible to achieve a connection between the customer and the service of the transportation means more rapidly and to greatly reduce the operational cost of the transportation means.

Furthermore, in the present invention, since a customer who wants to use mass transportation can inquire guide information for selecting an effective traffic route by the route guide service of mass traffic routes, the customer can move to a desired destination rapidly within a short time by referring to the route guide information of the mass traffic routes.

What is claimed is:

1. A system for processing transportation information using a communication network, comprising:
   customer communication means for performing a direct call connection to a transportation vehicle by the operation of a customer who wants to use a transportation service through the transportation vehicle, and for transmitting data via the direct call connection;
   a plurality of communication means for transportation vehicles for performing a direct call connection with the customer communication means, for receiving data from the customer communication means;
   information database means for storing subscriber information on the plurality of transportation vehicles and the communication means for transportation vehicles, connection history information on the communication means of each of said transportation vehicles and information on a charge as a cost for service of the customer communication means;
   host server means for selecting the communication means for transportation vehicles sequentially according to a predetermined order, the predetermined order based on the subscriber information and the connection history information in the information database means, and for providing a call command to the customer communication means for making the direct call connection with the communication means for transportation vehicles selected sequentially according to a predetermined order; and
   data relay means for performing the direct call connection between the customer communication means that has operated the call command and the communication means for transportation vehicles selected by the host server means, the customer communication means transmits the data to the communication means for transportation vehicles selected by the host server means during the direct call connection.

2. The system of claim 1, wherein the customer communication means is a mobile communication terminal for performing a call connection via a wireless communication network.

3. The system of claim 1, wherein the customer communication means is a wired communication terminal for performing a wire call connection via a public switched telephone network.

4. The system of claim 1, wherein the customer communication means comprises a network computer provided with a wire or wireless modem for internet communication and a dedicated web browser program for performing a call connection according to an internet phone function via an internet communication network.

5. The system of claim 1, wherein the plurality of communication means for transportation vehicles are a plurality of mobile communication terminals which perform a wireless call connection via a wireless communication network and wirelessly transmit empty vehicle information to the host server means in order to provide the transportation service.

6. A method for processing transportation information using a communication network, comprising:
   performing a call made by a customer to a transportation service using a customer communication means;
   identifying a current location of the customer by locating the customer communication means using a plurality of base stations and a communication service provider;
   identifying current locations of communication means for transportation vehicles using the base stations and the communication service provider;
   calling the communication means for transportation vehicles in a predetermined order among the communication means provided to the plurality of transportation vehicles based on the current location of the customer and the current locations of the communication means for transportation vehicles according to a call command by a host server for managing the transportation service to identify a transportation vehicle; and
   performing a direct call connection between the customer communication means and the communication means for transportation vehicles by processing the call for the communication means for transportation vehicles for the transportation vehicle;
   the customer communication means transmitting data to the communication means for transportation vehicles during the direct call connection.

7. The method of claim 6, wherein the transportation service by the transportation vehicle is a taxi call service by a taxi.

8. The method of claim 6, wherein the transportation service by the transportation vehicle is a repair shop's car transfer service for an accident-occurred car.

9. The method of claim 6, wherein the transportation service by the transportation vehicle is a car rental service.

10. The method of claim 6, wherein the transportation service by a transportation vehicle is a door-to-door delivery service by a delivery vehicle.

11. The method of claim 6, wherein the step of calling the communication means for transportation vehicles, further comprises the step of calling the next order communication means for transportation vehicles, if a call completion is not made with a first call to the communication means for transportation vehicles of the predetermined order.

12. A system for processing transportation information using a communication network, comprising:
   customer communication means for transmitting position information indicating the current position of a customer by operation of a customer who wants to use a transportation service through a transportation vehicle, for performing a direct call connection with the transportation vehicle providing the transportation service, and for transmitting data via the direct call connection;
   a plurality of communication means for transportation vehicles provided with the plurality of transportation vehicles providing the transportation service for transmitting a trip information indicating the trip position of the transportation vehicle and for performing a direct call connection with the customer communication means;
   information database means for storing subscriber information on the plurality of transportation vehicles and said communication means for transportation vehicles, current position information of the communication means for transportation vehicles and information on a charge as a cost for service for the communication means for transportation vehicles;
   host server means in which when connecting the customer communication means for using the transportation service, the transportation vehicle being on a trip in areas most adjacent to the current position of the customer communication means is searched based on the subscriber information in the information database means and on the trip position information on the plurality of transportation vehicles, and for providing a call command to the customer communication means to make a direct call connection with the communication means for transportation vehicles of the transportation vehicle; and data relay means for performing a direct call connection to the customer communication means by calling said transportation vehicle communication means according to the call command of the host server means.

13. The system of claim 12, wherein the customer communication means is a mobile communication terminal which receives the position information transmitted from a GPS satellite, stores it into the host server means as the position information of the customer and performs the call connection wirelessly via a wireless communication network.

14. The system of claim 13 wherein the host server means identifies whether the transportation service of the customer is used or not by searching whether the position information by a GPS satellite transmitted from the customer communication means and one of the communication means for transportation vehicles is maintained during a constant time at an adjacent position.

15. The system of claim 12, wherein the host server means comprises an automatic voice response system for guiding the input of the current position of the customer as voice; and the customer communication means comprises a wire communication terminal which is connected via the public switched telephone network by wire, inputs the current position information of the customer by executing the automatic voice response system and makes a direct call connection to the communication means transportation vehicles of the transportation vehicle.

16. The system of claim 12, wherein the customer communication means comprises a wire communication terminal in which, when connecting it via the public switched telephone network by wire, the current position of the customer is identified via the user's information by the telephone number identified in a telephone exchange of the public switched telephone network, and the direct call connection is made through it to the communication means for transportation vehicles.

17. The system of claim 12, wherein the host server means comprises an internet web site for inputting the current position of the customer by the operation of the customer communication means and using an internet telephone function; and the customer communication means comprises a network computer provided with a wire or wireless modem for an internet communication and a dedicated browser program and for connecting to the web site of the host server means, inputting the current position of the customer, and performing the call connection according to the internet telephone function.

18. The system of claim 12, wherein the plurality of communication means for transportation vehicles are mobile communication terminals which receive the position information transmitted from a GPS satellite via a wireless communication network and transmit it as trip position information for the transportation vehicles, and perform the direct call connection to the customer communication means via a wireless communication network.

19. The system of claim 12, wherein the trip position information stored to the information database means is updated every predetermined period of time.

20. The system of claim 12, wherein the system further comprises trip measuring means for accumulating distance and time of the trip, estimating the trip fare after the transportation vehicle picks up the customer, and transmitting the trip fare as trip information, and an interface device for converting the trip information from the trip measuring means into data format capable of transmitting via the communication means for transportation vehicles, wherein the host server means calculates the charge of the service of the customer according to the trip fare by the trip information received from the trip measuring means via the communication means for transportation vehicles for the transportation vehicle.

21. The system of claim 12, wherein the host server means generates map position data according to the position information of the customer and then transmits the data to the communication means for transportation vehicles being on a trip in areas adjacent to the current position of the customer, and the system further comprises a vehicle navigation apparatus mounted within each transportation vehicle for receiving the map position data of the customer who wants to use the transportation service and visually displaying it on an electronic map of the display screen based on the position information transmitted from a GPS satellite, and a data interface for converting the map position data received via the communication means for transportation vehicles and then outputting to the vehicle navigation apparatus, said communication network being a wireless communication network.

22. The system of claim 12, wherein the plurality of communication means for transportation vehicles store a specific code information of a trip area which is previously determined for the transportation vehicles and transmit the specific code information when transmitting the trip information.

23. A system for processing transportation information using a communication network, comprising:

a customer mobile communication terminal for performing a direct call connection to a transportation vehicle by the operation of a customer who wants to use a transportation service via a wireless communication network;

first wireless network means for exchanging high frequency signals with the customer mobile communication terminal and identifying the current position of the customer mobile communication terminal, said first wireless network means including a first mobile communication base station;

mobile communication terminals for transportation vehicles, one of which is provided with the transportation vehicle providing the transportation service, for a direct call connection to the customer mobile communication terminal via the wireless communication network;

second wireless network means for exchanging high frequency signals with the mobile communication terminals for transportation vehicles and identifying the current position of the mobile communication terminal for transportation vehicles of the transportation vehicle providing the transportation service, said second wireless network means including a second mobile communication base station;

information database means for storing subscriber information on the plurality of transportation vehicles and the mobile communication terminals for transportation vehicles, current position information of the mobile communication terminals for transportation vehicles and information on a charge for service of the customer mobile communication terminal;

host server means in which when connecting the customer mobile communication terminal for using the transportation service, the trip position of the mobile communication terminal for transportation vehicles identified by the second wireless communication network to the current position of the customer mobile communication terminal identified by the first wireless communication network is searched, and for providing a call command to the customer mobile communication terminal to make a direct call connection with the transportation vehicle by calling the transportation vehicle being on a trip in areas most adjacent to the current position of the customer mobile communication terminal; and data relay means for performing the direct call connection to the customer mobile communication terminal by calling the mobile communication terminal for the transportation vehicle according to the call command of the host server means, the customer communication terminal transmits data to the communication terminal for transportation vehicle during the direct call connection.

24. A system for processing transportation information using a communication network, comprising:

customer wireless communication means for performing a wireless connection to a transportation service by the operation of a customer who wants to use the transportation service via a wireless communication network;

first wireless network means for transmitting/receiving wireless information by exchanging high frequency signals with the customer wireless communication means and for identifying the current position of the customer wireless communication means, said first wireless network means including a first mobile communication base station;

mobile communication means for transportation vehicles, one of which is provided with the transportation vehicle providing the transportation service, for transmitting wireless information responding to the request for the transportation service from the customer wireless communication means via the wireless communication network;

second wireless network means for transmitting/receiving wireless information by exchanging high frequency signals with the mobile communication means for transportation vehicles and identifying the current position of the mobile communication means for transportation vehicles for the transportation vehicle providing the transportation service, said second wireless network means including second mobile communication base stations;

information database means for storing subscriber information on the plurality of transportation vehicles and mobile communication means for transportation vehicles, current trip position information of the mobile communication means for transportation vehicles of the transportation vehicle providing the transportation service and information on a charge for service of the customer wireless communication means;

host server means in which when connecting the customer wireless communication means for using the transportation service, the trip position of the mobile communication means for transportation vehicles identified by the second wireless communication network to the current position of the customer wireless communication means identified by the first wireless communication network is searched, and for providing a call command to the customer wireless communication means to make a direct call connection to the transportation vehicle by calling the transportation vehicle being on a trip in areas most adjacent to the current position of the customer wireless communication means; and data relay means for processing a wireless exchange of data for the customer wireless communication means by calling the mobile communication means for transportation vehicles according to the call command by the host server means, wherein the customer wireless communication means transmits data to the mobile communication means for transportation vehicles during the direct call connection.

25. A system of claim 24, wherein the host server means, when the current position of the customer wireless communication means is detected by the first wireless communication means, transmits a character message regarding the position detection to the customer wireless communication means, and when information regarding the position detection is received by the customer wireless communication means, transmits a character message indicating the current position of the customer wireless communication means to the second wireless communication means for transportation vehicles.

26. A system for processing transportation information using a communication network, comprising:

customer communication means for transmitting character information for indicating current position by the operation of a customer who wants to use a transportation service through a transportation vehicle and for performing a direct call with the transportation vehicle providing the transportation service;

a plurality of communication means for transportation vehicles, provided with the plurality of transportation vehicles providing the transportation service, for transmitting a character message information indicating the trip position of each of said transportation vehicles and for performing a direct call with the customer communication means;

information database means for storing character message information about the current position of the customer received from the customer communication means and character message information about trip position of each transportation vehicle from the plurality of communication means for transportation vehicles, in a state that includes the connection numbers of the plurality of communication means for transportation vehicles and local code information of the corresponding area of each transportation vehicle;

character recognition processing means for recognizing contents of character about character message information received from the customer communication means and the plurality of communication means for transportation vehicles and then creating the current position information of the customer and trip position information of each transportation vehicle;

host server means for performing a call command for a direct call connection between the communication means for transportation vehicles being on a trip in areas most adjacent to the current position of the customer and the customer communication means based on the current position information of the customer created from the character recognition processing means; and data relay means for performing the direct call connection to the customer communication means by calling the communication means for transportation vehicles according to the call command by the host server means, wherein the customer communication means transmits data to the communication means for transportation vehicles during the direct call connection.

* * * * *